United States Patent
Rao et al.

(10) Patent No.: US 9,554,296 B2
(45) Date of Patent: *Jan. 24, 2017

(54) DEVICE TRIGGER RECALL/REPLACE FEATURE FOR 3GPP/M2M SYSTEMS

(71) Applicant: Intel Corporation, Santa Clara, CA (US)

(72) Inventors: Varun Rao, Cincinnati, OH (US); Puneet Jain, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/124,984

(22) PCT Filed: Aug. 2, 2013

(86) PCT No.: PCT/US2013/053470
§ 371 (c)(1),
(2) Date: Dec. 9, 2013

(87) PCT Pub. No.: WO2014/022797
PCT Pub. Date: Feb. 6, 2014

(65) Prior Publication Data
US 2015/0181564 A1   Jun. 25, 2015

Related U.S. Application Data

(60) Provisional application No. 61/679,627, filed on Aug. 3, 2012.

(51) Int. Cl.
*H04W 24/10* (2009.01)
*H04W 24/04* (2009.01)
(Continued)

(52) U.S. Cl.
CPC ............ *H04W 24/10* (2013.01); *H04B 17/27* (2015.01); *H04L 5/00* (2013.01); *H04L 5/0035* (2013.01);
(Continued)

(58) Field of Classification Search
None
See application file for complete search history.

(56) References Cited

U.S. PATENT DOCUMENTS 5,754,638 A   5/1998  Kusunoki
6,625,227 B1  9/2003  Shull et al.
(Continued)

FOREIGN PATENT DOCUMENTS

CN  101730172 A  6/2010
CN  102333293 A  1/2012
(Continued)

OTHER PUBLICATIONS

"Access Network Discovery and Selection Function (ANDSF) Management Object MO", 3GPP TS 24.312, V11.4.0, Release 11, (Sep. 2012), 168.

(Continued)

*Primary Examiner* — Ayaz Sheikh
*Assistant Examiner* — Faiyazkhan Ghafoerkhan
(74) *Attorney, Agent, or Firm* — Schwegman Lundberg & Woessner, P.A.

(57) ABSTRACT

Embodiments for managing device trigger action requests are generally described herein. The device trigger action requests may include a recall or replacement Device-Action Request. In some embodiments, a Device-Action Request command is received at a network entry point node from an external services capability server with an action type attribute value pair set to indicate a device trigger action request for performing an action on an old device trigger request, the (Continued)

network entry point node determines a status of the old device trigger request from the external services capability server and the network entry point node sends a Device-Action Answer command to the external services capability server with a request-status type attribute value pair to report a status of the old device trigger request in response to the device trigger action request for performing an action on the old device trigger request.

23 Claims, 11 Drawing Sheets

(51) Int. Cl.

| | |
|---|---|
| H04W 28/02 | (2009.01) |
| H04W 52/00 | (2009.01) |
| H04L 5/00 | (2006.01) |
| H04L 12/24 | (2006.01) |
| H04L 12/26 | (2006.01) |
| H04L 12/807 | (2013.01) |
| H04L 29/06 | (2006.01) |
| H04L 29/08 | (2006.01) |
| H04W 4/00 | (2009.01) |
| H04W 8/18 | (2009.01) |
| H04W 28/04 | (2009.01) |
| H04W 36/00 | (2009.01) |
| H04W 40/34 | (2009.01) |
| H04W 52/02 | (2009.01) |
| H04W 72/00 | (2009.01) |
| H04W 72/04 | (2009.01) |
| H04W 76/02 | (2009.01) |
| H04W 24/02 | (2009.01) |
| H04N 21/2343 | (2011.01) |
| H04N 21/258 | (2011.01) |
| H04W 40/02 | (2009.01) |
| H04W 16/18 | (2009.01) |
| H04W 76/04 | (2009.01) |
| H04W 4/02 | (2009.01) |
| H04W 12/06 | (2009.01) |
| H04W 64/00 | (2009.01) |
| H04W 88/06 | (2009.01) |
| H04L 12/703 | (2013.01) |
| H04B 17/27 | (2015.01) |
| H04W 74/08 | (2009.01) |
| H04W 16/28 | (2009.01) |
| H04W 36/14 | (2009.01) |
| H04W 88/12 | (2009.01) |
| H04W 92/18 | (2009.01) |

(52) U.S. Cl.
CPC ......... *H04L 5/0057* (2013.01); *H04L 41/0659* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 8/18* (2013.01); *H04W 12/06* (2013.01); *H04W 16/18* (2013.01); *H04W 24/02* (2013.01); *H04W 24/04* (2013.01); *H04W 28/0221* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 52/0229* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 74/0816* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 88/06* (2013.01); *H04W 16/28* (2013.01); *H04W 36/14* (2013.01); *H04W 52/0258* (2013.01); *H04W 88/12* (2013.01); *H04W 92/18* (2013.01); *Y02B 60/50* (2013.01)

(56) References Cited

U.S. PATENT DOCUMENTS

| | | | |
|---|---|---|---|
| 7,474,686 B2 | 1/2009 | Ho | |
| 7,734,752 B2 | 6/2010 | Zuk et al. | |
| 7,924,742 B2 | 4/2011 | Hanes | |
| 8,155,102 B1 | 4/2012 | Hakola et al. | |
| 8,213,360 B2 | 7/2012 | Koskela et al. | |
| 8,359,038 B2 | 1/2013 | Hakola et al. | |
| 8,447,315 B2 | 5/2013 | Hakola et al. | |
| 8,520,575 B2 | 8/2013 | Doppler et al. | |
| 8,554,200 B2 | 10/2013 | Ribeiro et al. | |
| 8,577,363 B2 | 11/2013 | Wijting et al. | |
| 8,588,690 B2 | 11/2013 | Turtinen et al. | |
| 8,588,803 B2 | 11/2013 | Hakola et al. | |
| 8,666,403 B2 | 3/2014 | Yu et al. | |
| 8,755,316 B2 | 6/2014 | Aschan et al. | |
| 8,761,099 B2 | 6/2014 | Charbit et al. | |
| 8,775,944 B2 | 7/2014 | Hayton | |
| 8,909,265 B2* | 12/2014 | Xu | H04W 4/14 455/466 |
| 8,913,518 B2 | 12/2014 | Heo et al. | |
| 8,973,088 B1 | 3/2015 | Leung et al. | |
| 8,989,729 B2* | 3/2015 | Barclay | H04W 24/08 375/230 |
| 9,036,603 B2 | 5/2015 | Johnsson et al. | |
| 9,100,160 B2 | 8/2015 | Tarradell et al. | |
| 9,125,076 B2* | 9/2015 | Lehane | H04W 24/02 |
| 9,191,828 B2 | 11/2015 | Li et al. | |
| 9,301,083 B2* | 3/2016 | Jain | H04W 4/005 |
| 2002/0045428 A1 | 4/2002 | Chesson | |
| 2004/0170217 A1 | 9/2004 | Ho | |
| 2004/0258040 A1 | 12/2004 | Joshi et al. | |
| 2005/0043045 A1 | 2/2005 | Cheng et al. | |
| 2005/0190772 A1* | 9/2005 | Tsai | H04W 4/00 370/395.52 |
| 2007/0129076 A1 | 6/2007 | Cho et al. | |
| 2008/0045178 A1 | 2/2008 | Venkatachalam | |
| 2008/0052769 A1* | 2/2008 | Leone | H04L 63/0272 726/7 |
| 2008/0318607 A1 | 12/2008 | Torsner et al. | |
| 2009/0016232 A1 | 1/2009 | Kwon et al. | |
| 2009/0207817 A1 | 8/2009 | Montemurro et al. | |
| 2010/0009675 A1 | 1/2010 | Wijting et al. | |
| 2010/0009690 A1 | 1/2010 | Jin et al. | |
| 2010/0026802 A1 | 2/2010 | Titus et al. | |
| 2010/0110897 A1 | 5/2010 | Chun et al. | |
| 2010/0150082 A1 | 6/2010 | Shin et al. | |
| 2010/0238984 A1 | 9/2010 | Sayana et al. | |
| 2010/0265904 A1 | 10/2010 | Yang et al. | |
| 2010/0317345 A1 | 12/2010 | Futaki et al. | |
| 2010/0322173 A1 | 12/2010 | Marinier et al. | |
| 2011/0029834 A1 | 2/2011 | Yang et al. | |
| 2011/0134774 A1 | 6/2011 | Pelletier et al. | |
| 2011/0170420 A1 | 7/2011 | Xi et al. | |
| 2011/0188376 A1 | 8/2011 | Stupar et al. | |

(56) References Cited

U.S. PATENT DOCUMENTS

| | | |
|---|---|---|
| 2011/0250892 A1 | 10/2011 | Gupta et al. |
| 2011/0256894 A1 | 10/2011 | Khandelia et al. |
| 2011/0268006 A1 | 11/2011 | Koskela et al. |
| 2011/0280155 A1* | 11/2011 | Shi ................... H04W 8/04 370/254 |
| 2011/0292854 A1 | 12/2011 | Terry et al. |
| 2011/0306349 A1 | 12/2011 | Hakola et al. |
| 2011/0317559 A1 | 12/2011 | Kern et al. |
| 2011/0317571 A1 | 12/2011 | Kokkinen et al. |
| 2012/0011247 A1 | 1/2012 | Mallik et al. |
| 2012/0030358 A1 | 2/2012 | Mackenzie |
| 2012/0039273 A1 | 2/2012 | Nam et al. |
| 2012/0057476 A1 | 3/2012 | Chan et al. |
| 2012/0083283 A1 | 4/2012 | Phan et al. |
| 2012/0093098 A1 | 4/2012 | Charbit et al. |
| 2012/0106517 A1 | 5/2012 | Charbit et al. |
| 2012/0134344 A1 | 5/2012 | Yu et al. |
| 2012/0140743 A1 | 6/2012 | Pelletier et al. |
| 2012/0147815 A1 | 6/2012 | Meyer et al. |
| 2012/0155355 A1 | 6/2012 | Kwon et al. |
| 2012/0163296 A1 | 6/2012 | Cheon et al. |
| 2012/0176950 A1 | 7/2012 | Zhang et al. |
| 2012/0182962 A1 | 7/2012 | Patil et al. |
| 2012/0188949 A1 | 7/2012 | Salkintzis et al. |
| 2012/0190331 A1 | 7/2012 | Ahmed et al. |
| 2012/0198233 A1* | 8/2012 | George ............... H04L 51/34 713/168 |
| 2012/0202508 A1* | 8/2012 | Toth ................... H04W 4/00 455/450 |
| 2012/0213183 A1* | 8/2012 | Chen ................ H04W 72/1278 370/329 |
| 2012/0250520 A1 | 10/2012 | Chen et al. |
| 2012/0252481 A1* | 10/2012 | Anpat ................. H04W 8/06 455/456.1 |
| 2012/0309447 A1 | 12/2012 | Mustajarvi et al. |
| 2013/0021968 A1 | 1/2013 | Reznik et al. |
| 2013/0064138 A1 | 3/2013 | Hakola et al. |
| 2013/0077484 A1 | 3/2013 | Zhao et al. |
| 2013/0083653 A1* | 4/2013 | Jain ................... H04W 4/005 370/230 |
| 2013/0115983 A1* | 5/2013 | Ronneke ............ H04L 51/38 455/466 |
| 2013/0115993 A1* | 5/2013 | Jain ................... H04W 4/005 455/517 |
| 2013/0155948 A1* | 6/2013 | Pinheiro ............ H04W 4/005 370/328 |
| 2013/0155954 A1* | 6/2013 | Wang ................ H04W 4/005 370/328 |
| 2013/0160101 A1 | 6/2013 | Hakola et al. |
| 2013/0170351 A1 | 7/2013 | Reznik et al. |
| 2013/0182607 A1* | 7/2013 | Kim .................. H04W 76/025 370/254 |
| 2013/0223352 A1 | 8/2013 | Sartori et al. |
| 2013/0223356 A1 | 8/2013 | Khoshnevis et al. |
| 2013/0250910 A1 | 9/2013 | Liao et al. |
| 2013/0273855 A1* | 10/2013 | Cherian ............. H04W 4/005 455/68 |
| 2013/0279372 A1* | 10/2013 | Jain ................... H04W 4/06 370/254 |
| 2013/0288732 A1* | 10/2013 | Beale ................. H04L 47/12 455/509 |
| 2014/0004867 A1* | 1/2014 | Noh ................... H04W 76/023 455/450 |
| 2014/0011505 A1* | 1/2014 | Liao .................. H04W 68/025 455/450 |
| 2014/0022898 A1 | 1/2014 | Kim et al. |
| 2014/0025804 A1 | 1/2014 | Mongazon-cazavet et al. |
| 2014/0029530 A1* | 1/2014 | Kim .................. H04W 48/02 370/329 |
| 2014/0036774 A1* | 2/2014 | Lehane .............. H04W 24/02 370/328 |
| 2014/0036793 A1 | 2/2014 | Johnsson et al. |
| 2014/0036795 A1 | 2/2014 | Martinez Tarradell et al. |
| 2014/0036876 A1 | 2/2014 | Li et al. |
| 2014/0038549 A1* | 2/2014 | Lehane .............. H04W 24/02 455/406 |
| 2014/0040504 A1 | 2/2014 | Gupta |
| 2014/0050160 A1* | 2/2014 | Ronneke ........... H04W 76/028 370/329 |
| 2014/0086144 A1* | 3/2014 | Foti .................. H04L 61/106 370/328 |
| 2014/0092808 A1* | 4/2014 | Jain .................. H04W 52/0258 370/328 |
| 2014/0112251 A1* | 4/2014 | Kim .................. H04W 8/22 370/328 |
| 2014/0113609 A1* | 4/2014 | Elloumi ............ H04W 68/00 455/418 |
| 2014/0134996 A1* | 5/2014 | Barclay ............. H04W 24/08 455/422.1 |
| 2014/0171091 A1 | 6/2014 | Cai et al. |
| 2014/0177583 A1* | 6/2014 | Aso .................. H04W 4/005 370/329 |
| 2014/0185467 A1 | 7/2014 | Heo et al. |
| 2014/0269779 A1* | 9/2014 | Shan ................. H04W 28/24 370/509 |
| 2014/0286162 A1* | 9/2014 | Kim .................. H04W 8/02 370/230 |
| 2014/0307632 A1* | 10/2014 | Kim .................. H04W 4/005 370/328 |
| 2015/0016368 A1 | 1/2015 | Dai et al. |
| 2015/0023164 A1* | 1/2015 | Starsinic .......... H04W 28/0215 370/230 |
| 2015/0036672 A1 | 2/2015 | Kim et al. |
| 2015/0049732 A1 | 2/2015 | Xue et al. |
| 2015/0139197 A1 | 5/2015 | He et al. |
| 2015/0172909 A1* | 6/2015 | Chandramouli ........ H04W 8/10 455/433 |
| 2015/0173016 A1 | 6/2015 | Heo et al. |
| 2015/0181564 A1* | 6/2015 | Rao .................. H04W 24/04 370/329 |
| 2015/0208450 A1* | 7/2015 | Mademann ....... H04W 4/20 370/329 |
| 2015/0271623 A1* | 9/2015 | Kim .................. H04W 4/14 455/412.1 |
| 2015/0305077 A1 | 10/2015 | Johnsson et al. |
| 2016/0007390 A1* | 1/2016 | Starsinic .......... H04W 76/021 370/328 |
| 2016/0100441 A1 | 4/2016 | Li et al. |

FOREIGN PATENT DOCUMENTS

| | | |
|---|---|---|
| CN | 102333343 A | 1/2012 |
| CN | 102395160 A | 3/2012 |
| CN | 102612067 A | 7/2012 |
| CN | 103582006 A | 2/2014 |
| CN | 103582066 A | 2/2014 |
| CN | 104412524 A | 3/2015 |
| CN | 104429141 A | 3/2015 |
| CN | 104429147 A | 3/2015 |
| CN | 104471876 A | 3/2015 |
| EP | 2421306 A1 | 2/2012 |
| EP | 2566199 A1 | 3/2013 |
| EP | 2747508 A1 | 6/2014 |
| EP | 2880781 A1 | 6/2015 |
| EP | 2880782 A | 6/2015 |
| EP | 2880943 A1 | 6/2015 |
| EP | 2880952 | 6/2015 |
| EP | 2880955 A | 6/2015 |
| EP | 2880956 A2 | 6/2015 |
| ES | 2439623 A2 | 1/2014 |
| ES | 2440391 A2 | 1/2014 |
| ES | 2439623 R1 | 3/2014 |
| ES | 2440391 R1 | 3/2014 |
| ES | 2447215 A2 | 3/2014 |
| ES | 2473415 A2 | 7/2014 |
| ES | 2481265 R1 | 10/2014 |
| ES | 2507465 A1 | 10/2014 |
| ES | 2508390 A1 | 10/2014 |
| ES | 2510290 A1 | 10/2014 |
| ES | 2512965 A1 | 10/2014 |

(56) References Cited

FOREIGN PATENT DOCUMENTS

| | | | |
|---|---|---|---|
| ES | 2473415 R1 | 11/2014 |
| ES | 2523417 A1 | 11/2014 |
| ES | 2523474 A1 | 11/2014 |
| ES | 2525773 A1 | 12/2014 |
| ES | 2447215 R1 | 1/2015 |
| ES | 2481265 B2 | 5/2015 |
| FI | 125701 B | 1/2016 |
| FR | 2994361 A1 | 2/2014 |
| HK | 1207751 A1 | 2/2016 |
| JP | 2007295541 A | 11/2007 |
| JP | 2009141756 A | 6/2009 |
| JP | 2009272951 A | 11/2009 |
| JP | 2010199871 A | 9/2010 |
| JP | 2011530216 A | 12/2011 |
| JP | 2015527000 A | 9/2015 |
| KR | 20110049622 A | 5/2011 |
| KR | 1020110052426 A | 5/2011 |
| KR | 1020110086758 A | 7/2011 |
| KR | 1020110093642 A | 8/2011 |
| KR | 1020120031546 A | 4/2012 |
| KR | 1020120061881 A | 6/2012 |
| KR | 1020120070444 A | 6/2012 |
| KR | 1020120071676 A | 7/2012 |
| KR | 1020120074251 A | 7/2012 |
| KR | 1020120074255 A | 7/2012 |
| RU | 2322764 C1 | 4/2008 |
| RU | 2352980 C2 | 4/2009 |
| TW | 201410054 A | 3/2014 |
| TW | 201419898 A | 5/2014 |
| WO | WO-0163946 A1 | 8/2001 |
| WO | WO-2010028690 A1 | 3/2010 |
| WO | WO-2010080966 A1 | 7/2010 |
| WO | WO-2010130870 A1 | 11/2010 |
| WO | WO-2011088406 A1 | 7/2011 |
| WO | WO-2011119680 A2 | 9/2011 |
| WO | WO-2011130623 A1 | 10/2011 |
| WO | WO-2011131666 A1 | 10/2011 |
| WO | WO-2011134329 A1 | 11/2011 |
| WO | WO-2011139043 A2 | 11/2011 |
| WO | WO-2011160682 A1 | 12/2011 |
| WO | WO-2012016378 A1 | 2/2012 |
| WO | WO-2012028076 A1 | 3/2012 |
| WO | WO-2012056209 A1 | 5/2012 |
| WO | WO-2012061770 A2 | 5/2012 |
| WO | WO-2012066189 A1 | 5/2012 |
| WO | WO-2012068731 A1 | 5/2012 |
| WO | WO-2012077977 A2 | 6/2012 |
| WO | WO-2012087009 A2 | 6/2012 |
| WO | WO-2012091420 A2 | 7/2012 |
| WO | WO-2012092935 A1 | 7/2012 |
| WO | WO-2013022219 A1 | 2/2013 |
| WO | WO-2013185841 A1 | 12/2013 |
| WO | WO-2014021984 A1 | 2/2014 |
| WO | WO-2014021987 A1 | 2/2014 |
| WO | WO-2014021989 A1 | 2/2014 |
| WO | WO-2014021990 A1 | 2/2014 |
| WO | WO-2014021998 A2 | 2/2014 |
| WO | WO-2014021998 A3 | 2/2014 |
| WO | WO-2014022769 A1 | 2/2014 |
| WO | WO-2014022776 A1 | 2/2014 |
| WO | WO-2014022797 A1 | 2/2014 |

OTHER PUBLICATIONS

"C1-122989", 3GPP TSG-CT WG1 Meeting #79, (Aug. 6, 2012), 14 pgs.
"C1-123455", 3GPP TSG-CT WG1 Meeting #79, Revision of C1-123435, C1-123079, C1-122886, (Aug. 6, 2012), 97 pgs.
"C1-123965", 3GPP TSG-CT WG1 Meeting #80, (Oct. 2012), 15 pgs.
"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
"Evolved Universal Terrestrial Radio Access (E-UTRA); Radio Resource Control (RRC); Protocol specification", 3GPP TS 36.331 V11.2.0. Technical Specification Group Radio Access Network. Release 11., (Dec. 2012), 340 pgs.
"Evolved Universal Terrestrial Radio Access Network (E-UTRAN); S1 Application Protocol (S1AP)", 3GPP TS 36.413 V11.2.1. Technical Specification Group Radio Access Network. Release 11., (Feb. 2013), 272 pgs.
"International Application Serial No. PCT/US2013/044139, International Search Report mailed Sep. 16, 2013", 3 pgs.
"International Application Serial No. PCT/US2013/044139, Written Opinion mailed Sep. 16, 2013", 5 pgs.
"International Application Serial No. PCT/US2013/044384, International Search Report mailed Nov. 15, 2013", 3 pgs.
"International Application Serial No. PCT/US2013/044384, Written Opinion mailed Nov. 15, 2013", 5 pgs.
"International Application Serial No. PCT/US2013/044445, International Search Report mailed Sep. 16, 2013", 3 pgs.
"International Application Serial No. PCT/US2013/044445, Written Opinion mailed Sep. 16, 2013", 9 pgs.
"International Application Serial No. PCT/US2013/044530, International Search Report mailed Sep. 4, 2013", 3 pgs.
"International Application Serial No. PCT/US2013/044530, Written Opinion mailed Sep. 4, 2013", 7 pgs.
"International Application Serial No. PCT/US2013/044543, International Search Report mailed Aug. 27, 2013", 4 pgs.
"International Application Serial No. PCT/US2013/044543, Written Opinion mailed Aug. 27, 2013", 8 pgs.
"International Application Serial No. PCT/US2013/053470, International Search Report mailed Nov. 21, 2013", 3 pgs.
"International Application Serial No. PCT/US2013/053470, Written Opinion mailed Nov. 21, 2013", 4 pgs.
"Non-Access Stratum (NAS) configuration Management Object (MO)", 3GPP TS 24.368 V11.2.0. Technical Specification Group Core Network and Terminals. Release 11., (Sep. 2012), 13 pgs.
Doppler, Klaus, et al., "Device-to-Device Communication as an Underlay to LTE-Advanced Networks", IEEE Communications Magazine, 47(12), (Dec. 2009), 42-49.
Ericson, et al., "Device triggering procedure", C3-120956, 3GPP TSG-CT WG3 Meeting #69, Kyoto, Japan, [Online] retrieved from the internet: <http://v9ww.3gpp.org/ftp/tsg_ct/WG3_interworking_ex-CN3/TSGC3_69JKyoto/Docs/>, (May 21-25, 2012).
Ericsson, et al., "Control Signaling in Support of CoMP", R1-122843, 3GPP TSG-RAN WG1 #69, (May 2012).
Levy, Joseph, et al., "WLAN and Cellular Interworking and Discovery Use Case", IEEE 11-12/0346r0, (Mar. 9, 2012), 11 pgs.
Pekka, Janis, et al., "Interference-aware resource allocation for device-to-device radio underlaying cellular networks", IEEE, (2009), 5 pgs.
Zulhasnine, Mohammad, et al., "Efficient Resource Allocation for Device-to-Device Communication Underlaying LTE Network", IEEE 6th International Conference on Wireless and Mobile Computing, Networking and Communications, (2010), 368-375.
U.S. Appl. No. 13/711,338, filed Dec. 11, 2012, Establishing Application-Based Routing Policies in Multi-Mode User Equipment.
U.S. Appl. No. 13/687,838, filed Nov. 28, 2012, High Efficiency Distributed Device-to-Device (D2D) Channel Access.
U.S. Appl. No. 13/790,630, filed Mar. 8, 2013, Apparatus and Method for Small Data Transmission in 3GPP-LTE Systems.
U.S. Appl. No. 13/718,745, filed Dec. 18, 2012, Network Assistance for Device-to-Device Discovery.
U.S. Appl. No. 13/729,117, filed Dec. 28, 2012, Enhanced Node B, User Equipment and Methods for Discontinuous Reception in Inter-Web Carrier Aggregation.
U.S. Appl. No. 14/125,973, filed Dec. 13, 2013, Signaling and Channel Designs for D2D Communications.
U.S. Appl. No. 14/126,983, filed Dec. 17, 2013, Method and System for Enabling Device-to-Device Communication.
"3rd Generation Partnership Project; Technical Specification Group Core Network and Terminals; Access Network Discovery and Selection Function (ANDSF) Management Object (MO) (Release 11)", 3GPP TS 24.312 V11.3.0, (2012).

(56) References Cited

OTHER PUBLICATIONS

"3rd Generation Partnership Project; Technical Specification Group Core Network and Terminals; Access Network Discovery and Selection Function (ANDSF) Management Object (MO) (Release 11)", ETSI TS 24.312 Version 11.6.0, (Mar. 15, 2013).

"3rd Generation Partnership Project; Technical Specification Group Core Network and Terminals; Access Network Discovery and Selection Function (ANDSF) Management Object (MO) (Release 11)", ETSI TS 24.312 Version 11.3.0, (Jun. 27, 2012).

"3rd Generation Partnership Project; Technical Specification Group Services and System Aspects; Data Identification in Access Network Discovery and Selection Function (ANDSF) (DIDA) (Release 11)", 3GPP TR 23.855 V11.0.0, (2012).

"U.S. Appl. No. 13/711,338, Applicant Interview Summary mailed Aug. 25, 2014", 2 pgs.

"U.S. Appl. No. 13/711,338, Examiner Interview Summary mailed Aug. 21, 2014", 2 pgs.

"U.S. Appl. No. 13/711,338, Preliminary Amendment filed Mar. 15, 2013", 6 pgs.

"U.S. Appl. No. 13/718,745, Non Final Office Action mailed Aug. 7, 2014", 19 pgs.

"U.S. Appl. No. 13/718,745, Response filed Sep. 30, 2014 to Non Final Office Action mailed Aug. 7, 2014", 16 pgs.

"U.S. Appl. No. 13/729,117, Notice of Allowance mailed Aug. 12, 2014", 14 pgs.

"U.S. Appl. No. 13/790,630, Non Final Office Action mailed Sep. 5, 2014", 17 pgs.

"U.S. Appl. No. 14/125,973, Preliminary Amendment filed Dec. 13, 2013", 3 pgs.

"U.S. Appl. No. 14/126,983, Preliminary Amendment filed Dec. 17, 2013", 8 pgs.

"Application-ID", Qualcomm Incorporated, C1-122886, Change Request 24.312 CR 0098 rev—Current Version: 11.3.0 3GPP TSG-CT WG 1 Meeting #79, (2012), 1-14.

"Discussion on OS type leaf", Qualcomm Incorporated, C1-122076, 3GPP TSG CT WG1 Meeting #78, (May 2012).

"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.

"Finland Application Serial No. 20135806, Office Action mailed Aug. 15, 2014", 7 pgs.

"International Application Serial No. PCT/US2013/045656, International Search Report mailed Apr. 15, 2014", 3 pgs.

"International Application Serial No. PCT/US2013/045656, Written Opinion mailed Apr. 15, 2014", 10 pgs.

"International Application Serial No. PCT/US2013/053420, International Search Report mailed Dec. 2, 2013", 3 pgs.

"International Application Serial No. PCT/US2013/053420, Written Opinion mailed Dec. 2, 2013", 4 pgs.

"International Application Serial No. PCT/US2013/053428, International Search Report mailed Dec. 19, 2013", 4 pgs.

"International Application Serial No. PCT/US2013/053428, Written Opinion mailed Dec. 19, 2013", 8 pgs.

"Netherlands Application Serial No. 2011257, Search Report and Written Opinion mailed Mar. 18, 2014", 11 pgs.

"Netherlands Application Serial No. 2011259, Search Report mailed Jun. 13, 2014", 2 pgs.

"Netherlands Application Serial No. 2011259, Written Opinion mailed Jun. 13, 2014", 8 pgs.

"Spanish Application Serial No. P201331208, Search Report mailed Sep. 22, 2014", 4 pgs.

"Spanish Application Serial No. P201331208, Written Opinion mailed Sep. 22, 2014", 4 pgs.

"T5 based downlink small data transfer without establishing RRC security", CATT; 3GPP Draft: S2-122826 T5 Based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain (Jul. 2012), 3 pgs.

"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.

"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.

Abraham, Santosh, et al., "Efficient Device and Service Discovery for Peer-to-Peer (P2P) scenarios", IEEE 802.11-11/1517r0, (Oct. 25, 2011).

Fodor, Gabor, et al., "Design Aspects of Network Assisted Device-to-Device Communications", IEEE Communications Magazine, vol. 50, Issue 3, (Mar. 2012), 170-177.

Mobility, Motorola, et al., "Conclusions for Traffic Identification based on Application", (Nov. 2011).

U.S. Appl. No. 14/883,410, filed Oct. 14, 2015, High Efficiency Distributed Device-to-Device (D2D) Channel Access.

U.S. Appl. No. 14/816,282, filed Aug. 3, 2015, Apparatus and Method for Small Data Transmission in 3GPP-LTE Systems.

U.S. Appl. No. 14/695,930, filed Apr. 24, 2015, Network Assistance for Device-to-Device Discovery.

U.S. Appl. No. 14/570,555, filed Dec. 15, 2014, Enhanced Node B, User Equipment and Methods for Discontinuous Reception in Inter-ENB Carrier Aggregation.

"3rd Generation Partnership Project; Technical Specification Group Core Network and Terminals; Access Network Discovery and Selection Function (ANDBF) Management Object (MO) (Release 11)", 3GPP, 3GPP Draft; DRAPT_24312-B30,3rd Generation Partnership Project.(3GPP), Mobile Competence Centre ; 650, Route Des Lucioles ; M&921 Sophia Antiroub Cedex; France, (Jun. 15, 2015).

"Access Network Discovery and Selection Function (ANDSF) Management Object", Universal Mobile Telecommunications System (UMTS); LTE;, (Jul. 2012), 72-155.

"U.S. Appl. No. 13/687,838, Final Office Action mailed Apr. 10, 2015", 36 pgs.

"U.S. Appl. No. 13/687,838, Non Final Office Action mailed Nov. 26, 2014", 31 pgs.

"U.S. Appl. No. 13/687,838, Notice of Allowance mailed Jul. 16, 2015", 17 pgs.

"U.S. Appl. No. 13/687,838, Response filed Feb. 26, 2015 to Non Final Office Action mailed Nov. 26, 2014", 13 pgs.

"U.S. Appl. No. 13/687,838, Response filed Jun. 10, 2015 to Final Office Action mailed Apr. 10, 2015", 15 pgs.

"U.S. Appl. No. 13/711,338, Advisory Action mailed Oct. 7, 2015", 3 pgs.

"U.S. Appl. No. 13/711,338, Examiner Interview Summary mailed May 4, 2015", 3 pgs.

"U.S. Appl. No. 13/711,338, Final Office Action mailed Jul. 14, 2015", 14 pgs.

"U.S. Appl. No. 13/711,338, Non Final Office Action mailed Feb. 4, 2015", 16 pgs.

"U.S. Appl. No. 13/711,338, Response filed May 4, 2015 to Non Final Office Action mailed Feb. 4, 2015", 16 pgs.

"U.S. Appl. No. 13/711,338, Response filed Sep. 24, 2015 to Final Office Action mailed Jul. 14, 2015", 10 pgs.

"U.S. Appl. No. 13/718,745, Examiner Interview Summary mailed Sep. 16, 2014", 3 pgs.

"U.S. Appl. No. 13/718,745, Notice of Allowance mailed Jan. 21, 2015", 12 pgs.

"U.S. Appl. No. 13/790,630, Final Office Action mailed Feb. 3, 2015", 16 pgs.

"U.S. Appl. No. 13/790,630, Notice of Allowance mailed Mar. 31, 2015", 7 pgs.

"U.S. Appl. No. 13/790,630, Response filed Jan. 5, 2015 to Non Final Office Action mailed Sep. 5, 2014", 9 pgs.

"U.S. Appl. No. 13/790,630, Response filed Mar. 17, 2015 to Final Office Action mailed Feb. 3, 2015", 10 pgs.

"U.S. Appl. No. 14/125,973, Non Final Office Action mailed Oct. 29, 2015", 18 pgs.

(56) References Cited

OTHER PUBLICATIONS

"U.S. Appl. No. 14/126,983, Non Final Office Action mailed Jun. 3, 2015", 10 pgs.
"U.S. Appl. No. 14/126,983, Response filed Sep. 3, 2015 to Non Final Office Action mailed Jun. 3, 2015", 9 pgs.
"U.S. Appl. No. 14/570,555, Non Final Office Action mailed Sep. 10, 2015", 18 pgs.
"U.S. Appl. No. 14/570,555, Preliminary Amendment filed Mar. 2, 2015", 9 pgs.
"U.S. Appl. No. 14/695,930, Preliminary Amendment filed Jul. 16, 2015", 8 pgs.
"Application-ID, C1-122866, Change Request 24,312 CR 0098 rev—Current version: 11.3.0 3GPP TSG-CT WG1 Meeting #79", Qualcomm: Incorporated, Chicago (USA), [Online] retrieved from the internet: <URL:http://www.3gpp.org/ftp/tsg_ct/WG1_mm-cc-sm_ex-CN1/TSGC1_79_Chicago//docs>, (Jul. 30, 2012), 1-15.
"Australian Application Serial No. 2013297042, Non Final Office Action mailed Jun. 3, 2015", 3 pgs.
"Australian Application Serial No. 2013297042, Response filed Oct. 2, 2015 to Office Action mailed Jun. 3, 2015", 11 pgs.
"Belgian Application Serial No. 2013/0521, Response filed Nov. 9, 2015 to Search Report mailed May 15, 2015", w/ English Claims, 16 pgs.
"Belgian Application Serial No. 2013/0521, Search Report mailed May 15, 2015", W/ English Search Report, 11 pgs.
"Belgium Application Serial No. 2013/0522, Office Action mailed May 11, 2015", W/ English Search Report, 12 pgs.
"Finland Application Serial No. 20135806, Office Action mailed Sep. 22, 2015", 43 pgs.
"Finland Application Serial No. 20135807, Office Action mailed Mar. 26, 2015", in English, 8 pgs.
"Finland Application Serial No. 20135807, Response filed Jul. 23, 2015 to Office Action mailed Mar. 26, 2015", In English Translation, 26 pgs.
"International Application Serial No. PCT/US2013/044139, International Preliminary Report on Patentability mailed Feb. 12, 2015", 7 pgs.
"International Application Serial No. PCT/US2013/044445, International Preliminary Report on Patentability mailed Feb. 12, 2015", 11 pgs.
"International Application Serial No. PCT/US2013/044530, International Preliminary Report on Patentability mailed Feb. 12, 2015", 9 pgs.
"International Application Serial No. PCT/US2013/044543, International Preliminary Report on Patentability mailed Feb. 12, 2015", 10 pgs.
"International Application Serial No. PCT/US2013/045656, International Preliminary Report on Patentability mailed Feb. 12, 2015", 12 pgs.
"International Application Serial No. PCT/US2013/053420, International Preliminary Report on Patentability mailed Feb. 12, 2015", 6 pgs.
"International Application Serial No. PCT/US2013/053428, International Preliminary Report on Patentability mailed Feb. 12, 2015", 10 pgs.
"International Application Serial No. PCT/US2013/053470, International Preliminary Report on Patentability mailed Feb. 12, 2015", 6 pgs.
"Japanese Application Serial No. 2015-523086, Office Action mailed Sep. 8, 2015", W/ English Translation, 9 pgs.
"Korean Application Serial No. 10-2015-7000080, Office Action mailed Sep. 24, 2015", W/ English Translation, 20 pgs.
"Korean Application Serial No. 2014-7036954, Reasons for Rejection mailed Jul. 24, 2015", W/ English Translation, 9 pgs.
"Korean Application Serial No. 2014-7036954, Response filed Sep. 24, 2015 to Reasons for Rejection mailed Jul. 24, 2015", W/ English Claims, 28 pgs.
"Spanish Application Serial No. 201331212, Office Action mailed Mar. 2, 2015", W/ English References, 1 pg.
"Spanish Application Serial No. 201331212, Office Action mailed Jul. 14, 2015", W/ English Translation, 8 pgs.
"Spanish Application Serial No. 201331212, Response filed Feb. 24, 2015 to Office Action mailed Jul. 14, 2015", 10 pgs.
"Spanish Application Serial No. 201331212, Response filed Nov. 9, 2015 to Office Action mailed Jul. 14, 2015", W/ English Claims, 17 pgs.
"Spanish Application Serial No. 201331212, Search Report mailed Oct. 27, 2014", W/ English References, 4 pgs.
"Spanish Application Serial No. 201331212, Written Opinion mailed Oct. 27, 2014", W/ English Translation, 10 pgs.
"Spanish Application Serial No. P201331208, Response filed Feb. 6, 2015 to Office Action mailed Sep. 22, 2014", in Spanish, 18 pgs.
"Sweden Application Serial No. 1350931-0, Office Action mailed Dec. 29, 2014", w/ English Claims, 16 pgs.
"Sweden Application Serial No. 1350932-8, Office Action mailed Jan. 21, 2015", W/ English Translation, 5 pgs.
"Taiwanese Application Serial No. 102127609, Office Action mailed Dec. 1, 2014", w/ English Translation, 15 pgs.
"Taiwanese Application Serial No. 102127609, Response filed Jun. 3, 2015 to Office Action mailed Dec. 1, 2014", W/ English Claims, 55 pgs.
"Taiwanese Application Serial No. 102127618, Office Action mailed Dec. 1, 2014", W/ English Translation, 20 pgs.
"Taiwanese Application Serial No. 102127618, Response filed Mar. 2, 2015 to Office Action mailed Dec. 1, 2014", W/ English Claims, 10 pgs.
Qualcomm Incorporated, et al., "Operating System definition for DIDA", 3GPP TSG-CT WG1 Meeting #81, 3GPP, C1-125017, (Nov. 19, 2012).
"Brazilian Application Serial No. BR112015000355-9, Preliminary Amendment filed Jun. 6, 2013", W/ English Claims, 10 pgs.
"Chinese Application Serial No. 201380035790.0, Preliminary Amendment filed May 30, 16", W/ English Claims, 13 pgs.
U.S. Appl. No. 15/176,433, filed Jun. 8, 2016, Apparatus of User Equipment (UE) Configurable for Connectivity with Multiple Cell Groups.
"Draft 2 Minutes of 3GPP", 3GPP TSG-SA WG1 Meeting #58: S1-122004, (2012), 78 pgs.
"[Draft] LS on Tsp", TSG-CT-WG3: 3GPP Draft; C3-121281_LS_ON_TSP-Draft, 3rd Generation Partnership Project (3GPP), Mobile Competence Centre; 650, Route Des Lucioles ; F-06921 Sophia-Antipolis Cedex; France, vol. CT WG3, No. Kyoto, Japan; May 21-25, 2012, (May 29, 2012), 2 pgs.
"3rd Generation Partnership Project; Technical Specification Group Core Network and Terminals; Tsp interface protocol between the MTC Interworking Function (MTC-IWF) and Service Capability Server (SCS) (Release 11)", 3GPP Standard; 3GPP TS 29.368, 3rd Generation 3GPP Standard; 3GPP TS 29.368, 3rd Generation; 650, Route Des Lucioles ; F-06921 Sophia-Antipolis Cedex; France, vol. CT WG1, No. V1.0.0., (Jun. 6, 2012), 1-17.
"3rd Generation Partnership Project; Technical Specification Group Services and System Aspects; Architecture enhancements to facilitate Communications with packet data networks and applications (Release 11)", 3gpp Draft; 23682-010-CI, 3rd Generationpartnership Project (3GPP), Mobile Competence Centre ; 650, Route Des Lucioles ; F-06921 Sophia-Antipolis Cedex ; France, (Jul. 6, 2012), 27 pgs.
"Access Network Discovery and Selection Function (ANDSF) Management Object (MO)", ETSI TS 124 312 V11.4.0 (3GPP TS 24.312 version 11.4.0 Release 11). Universal Mobile Telecommunications System (UMTS). LTE., (Oct. 2012), 170 pgs.
"Access to the 3GPP Evolved Packet Core (EPC) via non-3GPP access networks; Stage 3", ETSI TS 124 302 V11.4.0 (3GPP TS 24.302 version 11.4.0 Release 11). Universal Mobile Telecommunications System (UMTS). LTE., (Oct. 2012), 64 pgs.
"U.S. Appl. No. 13/711,338, Examiner Interview Summary mailed Nov. 23, 2015", 2 pgs.
"U.S. Appl. No. 13/711,338, Non Final Office Action mailed Mar. 28, 2016", 15 pgs.
"U.S. Appl. No. 14/125,973, Response filed Jan. 29, 2016 to Non Final Office Action mailed Oct. 29, 2015", 10 pgs.

(56) References Cited

OTHER PUBLICATIONS

"U.S. Appl. No. 14/126,983, Examiner Interview Summary mailed Jan. 15, 2016", 3 pgs.
"U.S. Appl. No. 14/126,983, Final Office Action mailed Nov. 19, 2015", 9 pgs.
"U.S. Appl. No. 14/126,983, Notice of Allowance mailed Feb. 4, 2016", 5 pgs.
"U.S. Appl. No. 14/126,983, Response filed Jan. 19, 2016 to Final Office Action mailed Nov. 19, 2015", 7 pgs.
"U.S. Appl. No. 14/126,983, Supplemental Notice of Allowability mailed Feb. 19, 2016", 2 pgs.
"U.S. Appl. No. 14/126,983, Supplemental Notice of Allowability mailed Mar. 31, 2016", 2 pgs.
"U.S. Appl. No. 14/126,983, Supplemental Notice of Allowability mailed Apr. 12, 2016", 2 pgs.
"U.S. Appl. No. 14/570,555, Notice of Allowability mailed Mar. 18, 2016", 12 pgs.
"U.S. Appl. No. 14/570,555, Notice of Allowance mailed Feb. 19, 2016", 15 pgs.
"U.S. Appl. No. 14/570,555, Response filed Jan. 11, 2016 to Non Final Office Action mailed Sep. 10, 2015", 12 pgs.
"U.S. Appl. No. 14/883,410, Non Final Office Action mailed Feb. 26, 2016", 44 pgs.
"U.S. Appl. No. 14/883,410, Preliminary Amendment filed Dec. 21, 2015", 8 pgs.
"Canadian Application Serial No. 2,878,215, Office Action mailed Feb. 25, 2016", 5 pgs.
"Chinese Application Serial No. 201310336123.8, Office Action mailed Jan. 4, 2016", W/ Machine Translation, 9 pgs.
"Chinese Application Serial No. 201310435389.8, Office Action mailed Feb. 1, 2016", W/ English Translation, 6 pgs.
"Discussion paper on DIDA operative System leaf", 3GPP Draft; C1-122885-Dida-Disc-Operating-System-V1, 3rd Generation Partnership Project (3GPP), Mobile Competence Centre ; 650, Route Des Lucioles ; F-06921 Sophia-Antipolis Cedex ; France, (Jul. 30, 2012).
"European Application Serial No. 09832221.7, Extended European Search Report mailed Mar. 31, 2016", 10 pgs.
"European Application Serial No. 13825086.5, Extended European Search Report mailed Feb. 2, 2016", 7 pgs.
"European Application Serial No. 13825253.1, Extended European Search Report mailed Mar. 17, 2016", 9 pgs.
"European Application Serial No. 13825698.7, Extended European Search Report mailed Mar. 15, 2016", 9 pgs.
"European Application Serial No. 13825895.9, Extended European Search Report mailed Feb. 4, 2016", 10 pgs.
"European Application Serial No. 13825940.3, Extended European Search Report mailed May 3, 2016", 6 pgs.
"European Application Serial No. 13826192.0, Partial Supplementary European Search Report mailed Feb. 8, 2016", 7 pgs.
"Finland Application Serial No. 20135806, Response filed Dec. 15, 2014 to Office Action mailed Aug. 15, 2014", With English translation of claims, 6 pgs.
"Finland Application Serial No. 20135806, Response filed Dec. 22, 2015 to Office Action mailed Sep. 22, 2015", W/ English Claims, 5 pgs.
"France Application Serial No. 1357654, Office Action mailed Apr. 1, 2016", Without English Translation, 6 pgs.
"Japanese Application Serial No. 2015-524265, Office Action mailed Dec. 22, 15", W/ English Translation, 5 pgs.
"Japanese Application Serial No. 2015-524265, Response filed Feb. 1, 2016 to Office Action mailed Dec. 22, 2015", W/ English Claims, 22 pgs.
"Korean Application Serial No. 10-2015-7000080, Response filed Feb. 24, 2016 to Office Action mailed Sep. 24, 2015", W/ English Translation, 34 pgs.
"Korean Application Serial No. 10-2015-7000081, Office Action mailed Dec. 28, 2015", W/ English Translation, 5 pgs.
"Korean Application Serial No. 10-2015-7000081, Response filed Feb. 12, 2016 to Office Action mailed Dec. 28, 2015", W/ English Translation, 9 pgs.
"Korean Application Serial No. 10-2016-7004953, Notice of Preliminary Rejection mailed Apr. 7, 2016", W/ English Translation, 12 pgs.
"Korean Application Serial No. 2014-7036954, Final Office Action mailed Jan. 28, 2016", w/ English Translation, 5 pgs.
"Korean Application Serial No. 2014-7036954, Final Office Action mailed Apr. 5, 2016", 6 pgs.
"Korean Application Serial No. 2014-7036954, Response filed Feb. 29, 2016 to Final Office Action mailed Jan. 28, 2016", w/ English Claims, 24 pgs.
"Russian Application Serial No. 2014153568, Office Action mailed Feb. 29, 2016", W/ English Translation, 10 pgs.
"Spanish Application Serial No. 201331212, Office Action mailed Dec. 28, 2015", W/ English Translation, 8 pgs.
"Spanish Application Serial No. 201331212, Response filed Mar. 18, 2016 to Office Action mailed Dec. 28, 2015", 16 pgs.
"Use case: Enabling ProSe via LTE+WLAN", 3GPP TSG-SA WG1 Meeting #58: S1-121089, (May 2012), 4 pgs.
Asustek, et al., "DRX Operation with different TDD UL/DL configurations (R2-115823)", 3rd Generation Partnership Project (3GPP) Draft, (Nov. 8, 2011).
Interdigital, "DRX Procedures for Carrier Aggregation (R2-094217)", 3rd Generation Partnership Project (3GPP) Draft, (Aug. 18, 2009).

* cited by examiner

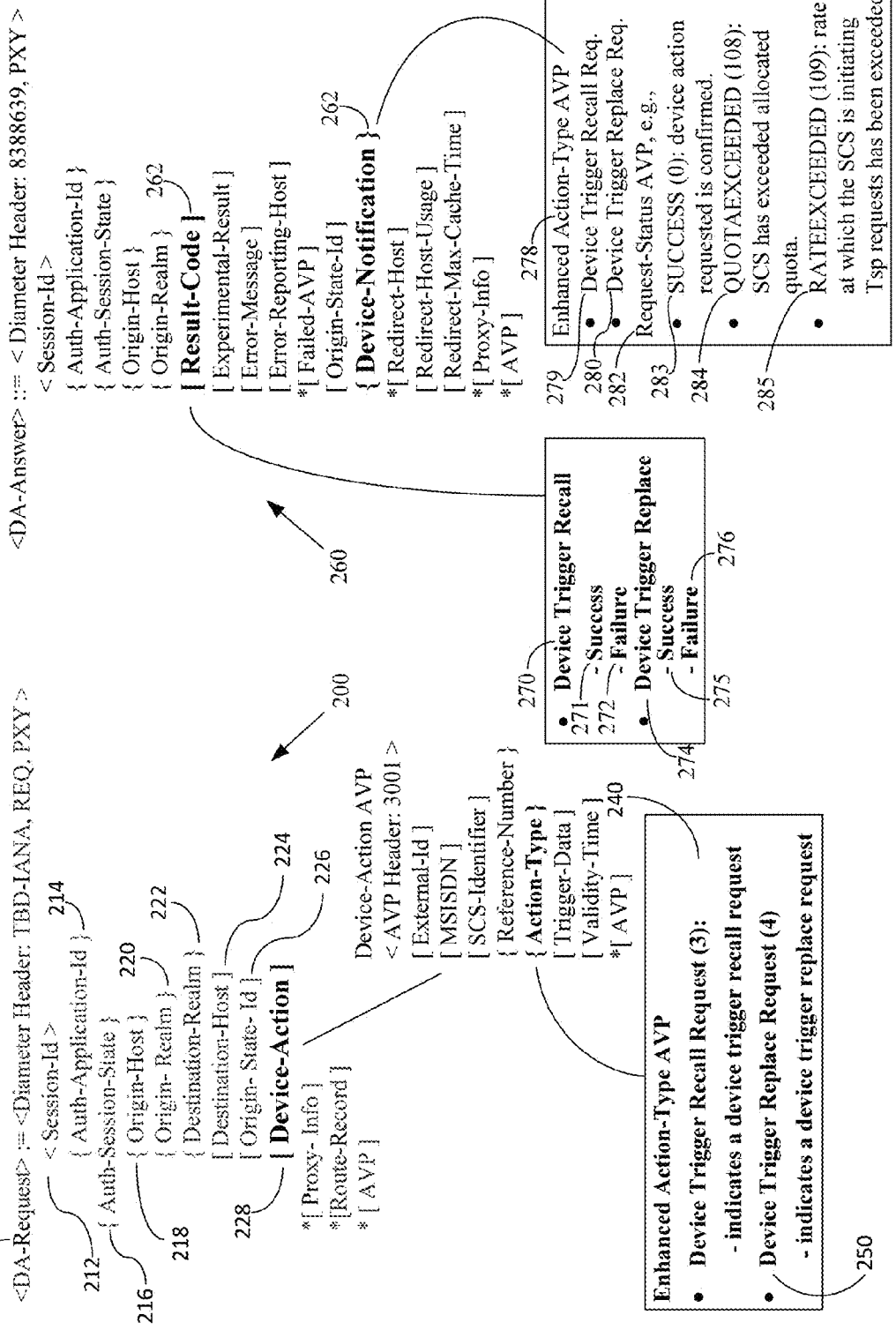

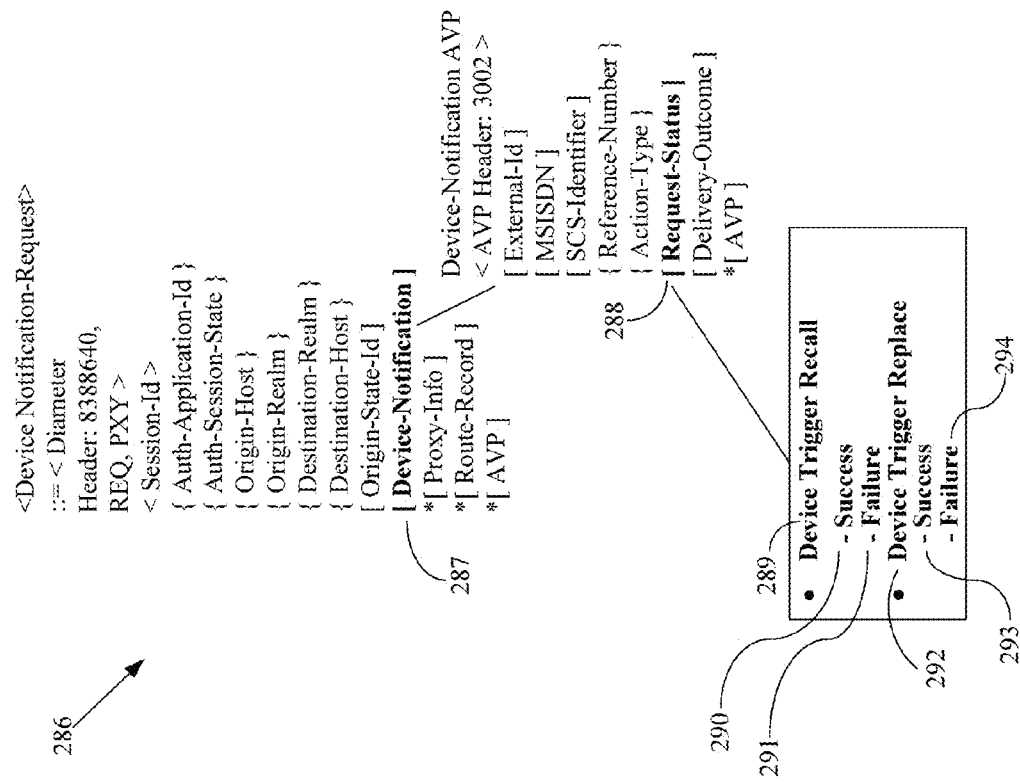

DEVICE TRIGGER RECALL/REPLACE FEATURE FOR 3GPP/M2M SYSTEMS

RELATED APPLICATION

This application is a U.S. National Stage Application under U.S.C. 371 of International Application No. PCT/US2013/053470, filed, Aug. 2, 2013 which application claims the benefit of priority to U.S. Provisional Patent Application Ser. No. 61/679,627, filed Aug. 3, 2012 and entitled "ADVANCED WIRELESS COMMUNICATION SYSTEMS AND TECHNIQUES," which applications are hereby incorporated by reference in their entirety.

BACKGROUND

With a wide range of potential applications, Machine Type Communication (MTC) or Machine to Machine (M2M) communication is gaining a tremendous interest among mobile network operators, equipment vendors, MTC specialist companies, and research bodies. The idea of M2M communications is to enable M2M components to be interconnected, networked, and controlled remotely with low-cost scalable and reliable technologies. M2M communication could be carried over mobile networks (e.g. GSM-GPRS, CDMA EVDO networks). In the M2M communication, the role of mobile network is largely confined to serve as a transport network.

An M2M device is capable of replying to request for data contained within those devices or capable of transmitting data autonomously. Sensors and communication devices are the endpoints of M2M applications.

Triggering of MTC devices is based on the use of an identifier identifying the MTC device that needs to be triggered. The MTC device trigger is used by the network to wake up the device, e.g., to initiate communications. A services capability server/application server (SCS/AS) may use a device trigger to send information to the user equipment (UE) via the third generation partnership project (3GPP) network to trigger the UE to perform application specific actions that include initiating communication with the services capability server (SCS) for the indirect model or an application server (AS) in the network for the hybrid model.

However, a UE may become temporarily unavailable to receive trigger messages, e.g., when the UE is out of coverage or is resource constrained, when the UE runs out of storage space, etc. In such cases, the network stores or en-queues the undelivered trigger messages for the same UE and re-attempts delivery at a later stage if the trigger validity period has not expired. Nevertheless, when a trigger is queued for delivery, the trigger may no longer be necessary or the trigger message itself may become redundant or irrelevant. For example, a stored trigger message that requests the UE to send smart meter billing data for 10 minutes may later be ineffective because 20 minutes of smart meter billing data may now be requested. A stored trigger message that requests the UE to establish a user plane communication link may become obsolete if the trigger message is queued for too long. Also, the SCS/AS may lose the context for the device trigger while the device trigger is queued. Further, if unnecessary triggers are delivered, then network resources are wasted and the network becomes inefficient.

BRIEF DESCRIPTION OF THE DRAWINGS

FIGS. 2a-c illustrate a Device-Action Request (DAR) command, a Device-Action Answer and a Device-Notification Request according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Figure 1:
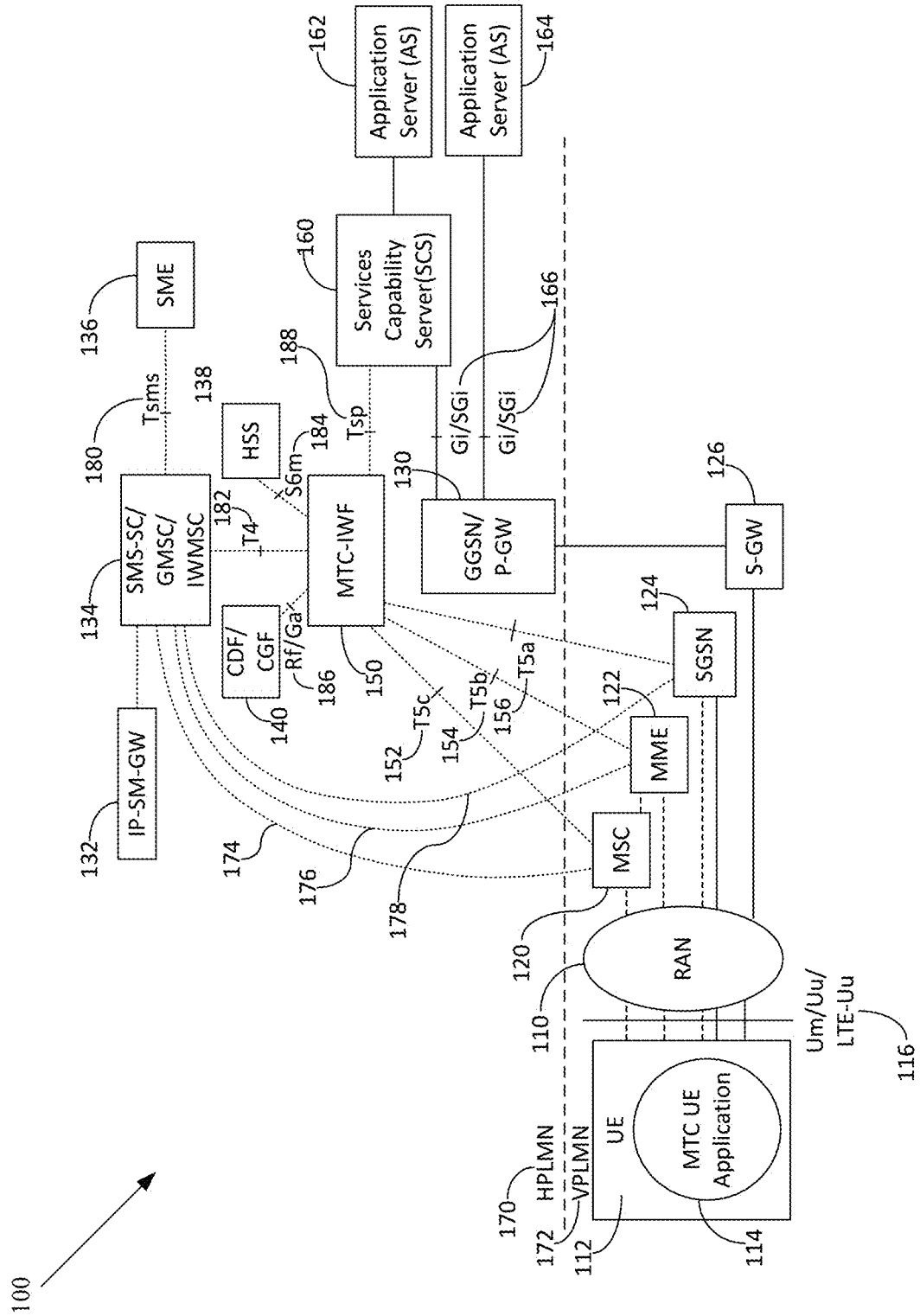
FIG. 1 illustrates an architecture for supporting machine-type communication (MTC) according to an embodiment.

FIG. 1 illustrates an architecture 100 for supporting machine-type communication (MTC) according to an embodiment. In FIG. 1, a radio access network (RAN) 110 provides a user equipment (UE) access to a communications network. The UE includes a machine type communication application 114. A Um/Uu/LTE-Uu interface 116 provides a signaling interface between the domain of the UE 112 and the access domain, i.e., RAN 110. The RAN 110 is coupled to a mobile switching center (MSC) 120, a mobile management entity (MME) 122, a serving general packet radio service (GPRS) support node (SGSN) 124 and a serving gateway (S-GW) 126. The network 100 may be divided into a home public land mobile network (HPLMN) 170 and a visited public land mobile network (VPLMN) 172.

The MSC 120 acts like a switching node within a PSTN or ISDN, but also provides additional functionality to enable support of a mobile user. These include registration, authentication, call location, inter-MSC handovers and call routing to a mobile subscriber. The MME is a control-node and is responsible for idle mode UE (User Equipment) tracking and paging procedure including retransmissions. The MME is involved in the bearer activation/deactivation process and is also responsible for choosing the S-GW 126 for a UE at the initial attach and at time of intra-LTE handover involving Core Network (CN) node relocation.

The SGSN 124 is responsible for the delivery of data packets from and to the UEs within its geographical service area. The SGSN 124 handles packet routing and transfer, mobility management (attach/detach and location management), logical link management, and authentication and charging functions. The S-GW 126 routes and forwards user data packets, while also acting as the mobility anchor for the user plane during inter-eNodeB handovers and as the anchor for mobility between LTE and other 3GPP technologies.

The S-GW 126 is coupled to a gateway GPRS support node/packet gateway (GGSN/PGW) 130. A GGSN 130 manages the internetworking between a GPRS network and external packet switched networks, like the Internet and X.25 networks. A GGSN 130 also enables the mobility of the user terminal in the GPRS/UMTS networks and maintains routing to tunnel the protocol data units (PDUs) for servicing a particular UE. A PGW 130 provides connectivity from the UE to external packet data networks by being the point of exit and entry of traffic for the UE. The P-GW 130 performs policy enforcement, packet filtering for a user, charging support, lawful interception and packet screening. A PGW 130 may also act as an anchor for mobility between 3GPP and non-3GPP technologies, such as WiMAX and 3GPP2.

The MSC 120, MME 122 and the SGSN are coupled to a machine type communication interworking functions (MTC-IWF) 150. The MTC-IWF 150 interfaces with other 3GPP entities for providing various MTC services. For example, the MTC-IFW 150 supports device trigger functionality over Tsp and T4 reference points and may generate the charging data records (CDRs) for the device trigger. While embodiments are described herein using device messages, other types of messaging may also be used according to embodiments, e.g., small data transmissions, etc.

The MTC-IWF 150 is coupled to the charging data function/charging gateway function (CDF/CGF) 140, a 3GPP home subscriber server (HSS) 138, and short message service-service center/gateway mobile switching center/interworking mobile switching center (SMS-SC/GMSC/IWMSC) 134. Charging function addresses are addresses distributed to IMS entities and provide a common location for an entity to send charging information. CDF addresses are used for offline billing and Online Charging Function (OCF) for online billing. The CDF 140 will collect accounting information, and build a Call Detail Record (CDR), which is sent to the billing system (BS) of the domain. The charging gateway function (CGF) 140 listens to messages providing charging data that is sent from the general packet radio service (GPRS) support nodes (GSNs). The CGF retrieves charging data records (CDRs) from the GGSN. The 3GPP HSS 138 maintains the master database for a given user. The HSS 138 is the entity containing the subscription-related information to support the network entities actually handling calls/sessions.

In FIG. 1, the SMS-SC/GMSC/IWMSC 134 includes the SMS-SC, the SMS-GMSC and the SMS-IWMSC. The SMS-SC of the SMS-SC/GMSC/IWMSC 134 acts as a store and forward center for SMS messages. The Short Message Service Gateway MSC (SMS-GMSC) and the Short Message Service Interworking MSC (SMS-IWMSC) connect the SMS-SC to the GPRS network. The SMS-GMSC and SMS-IWMSC are connected to the SGSN through connection 178 to enable GPRS UEs to send and receive SMS messages through the SGSN. The SMS-IWMSC may receive SMS messages from a public land mobile network (PLMN) and submit them to the receiving SMS-SC. The SMS-SC/GMSC/IWMSC 134 may also be coupled to the MSC 120 via connection 174 and to MME 122 via connection 176. The SMS-SC/GMSC/IWMSC 134 may be further coupled to an Internet Protocol-Short-Message-Gateway (IP-SM-GW) 132 and short message entities (SME) 136. The IP-SM-GW 132 provides the protocol interworking for the submission of short messages. The SME 136 includes network entities, e.g., mobile stations, cell phones, UEs, that can send/receive short messages.

The MTC-IWF 150 is further coupled to a services capability server (SCS) 160. The SCS connects MTC application servers (AS) 162 to the 3GPP network to enable them to communicate through specific 3GPP defined services with UEs 112 used for MTC and with the MTC-IWF 150. The SCS offers capabilities for use by one or multiple MTC AS 162. An AS 164 may also be coupled to the GGSN/PGW 130. Thus, an AS 164 may connect directly to the operator network in order to perform direct user plane communications with a UE 112 without the use of the SCS 160. However, the SCS 160 may provide value added services for MTC and perform user plane and/or control plane communication with the UE. The Tsp interface is an inter-domain interface for control plane communication. The Tsp interface 188 may deliver a device trigger request from SCS 160 to MTC-IWF 150, and reports the acceptance/success (or the non-acceptance/failure) of this request. The Tsms interface 180 may be used to send a trigger to a MTC UE encapsulated in a Mobile Terminating-SMS (MT-SMS) as an over-the-top application by any network entity (e.g., SCS) acting as a SME. The T4 interface 182 may be used to transfer a device trigger from MTC-IWF 150 to SMS-SC 160, provides serving node's information corresponding to IMSI, and reports the success or failure of delivering a device trigger to the MTC UE 112. The S6m interface 184 maps MSISDN or external identifier to IMSI and resolves the serving nodes identities of the MTC UE 112.

The T5a 156, T5b 154 and T5c 152 reference points connect the MTC-IWF 150 to the serving SGSN 124, connects the MTC-IWF 150 to the serving MME 122, and connect the MTC-IWF 150 to the serving MSC 120, respectively. The T5a 156, T5b 154 and T5c 152 reference points also support device trigger functionality, including the transfer of a device trigger request to the MSC 120, MME 122, SGSN 124, reporting to the MTC-IWF 150 the success or failure of delivering a device trigger to the UE 112 and providing MME 122/SGSN 124 congestion/load information to the MTC-IWF 150. The Gi/SGi interface 166 provides an interface into packet data networks (PDN). The SGi is the interface to the IP packet data network and the Gi is the interface to external packet data networks, e.g., Internet, and contains the end-user's IP point of presence. The Rf/Ga interface 186 provides interface signal between the MTC-IWF 150 and the CDF/CGF 140. The Rf interface provides access to CTF of the CDF/CGF 140 and the Ga interface provides access to the CGF of the CDF/CGF 140.

End-to-end services between the M2M Applications in the UEs 112 and the M2M applications provided at the MTC AS 162 in the external network use services provided by the 3GPP2 system, and optionally services provided by the SCS 160. The 3GPP2 system provides transport and communication services, including 3GPP2 bearer services, e.g., IMS and SMS, and various optimizations, that can facilitate M2M type of services. As described above, the SCS 160 connects MTC application servers (AS) 162 to the 3GPP network to enable them to communicate through specific 3GPP defined services with UEs 112 used for MTC and with the MTC-IWF 150. For example, the MTC-IWF 150 is arranged to support reception of a device trigger request from the SCS 160, reporting to the SCS 162 the acceptance or non-acceptance of the device trigger request, reporting to the SCS 162 the success or failure of a device trigger delivery if known, providing load control information to the SCS 162 as part of the response to trigger requests.

The MTC-IWF 150 may transmit an SMS request in terms of an MTC device trigger. MTC device triggering may start from an MTC application at an AS 162. The MTC application at the AS 162 may communicate with the SCS 160 for MTC device triggering. The SCS 160 may transmit a request for device triggering to the MTC-IWF 150 with external MTC device identities, UE 112, via the Tsp interface 188.

Device-Action commands and Device Notification commands are used to support MTC between the MTC-IWF 150 and the SCS 160. A Device-Action-Request (DAR) command may be sent by the SCS 160 to the MTC-IWF 150 to request an action. For T4 device triggering, the MTC-IWF 150 may send an SMS-SC 160 a Submit Trigger Replace/Recall Request with an external identifier or MSISDN, IMSI, SCS Identifier, old device trigger reference number, new device trigger reference number, validity period, priority, trigger payload, etc. The new device trigger reference identifies a new device trigger request for substituting with the old device trigger request identified by the old device trigger reference number.

When the DAR is a Submit Trigger Replace Request, a new device trigger reference is provided to distinguish the old device trigger reference from the new device trigger reference. For T5 device triggering, the MTC-IWF 150 identifies which trigger message is to be replaced/recalled using the old device trigger reference number, and, if the DAR command is a replace command, using the new device trigger reference.

The SMS-SC 160 may send the MTC-IWF 150 a Submit Trigger Replace/Recall Response message. If the old device trigger request is pending at the SMS-SC 160 or has been delivered to the UE with failure, the SMS-SC 160 may send to the MTC-IWF 150 a Submit Trigger Replace/Recall Response message indicating old device trigger request has been successfully replaced/recalled (deleted). The SMS-SC 160 may also send the MTC-IWF 150 a Trigger Delivery Report for the original trigger message indicating that the old device trigger request has been replaced/recalled.

If the old device trigger request has successfully been delivered to the UE, or if the old device trigger request has expired, the SMS-SC 160 may send to the MTC-IWF 150 a Submit Trigger Replace Response message indicating that the old device trigger has successfully delivered and that the SMS-SC 160 will deliver the new device trigger request. For a recall request, the SMS-SC 160 may send to the MTC-IWF 150 a Submit Trigger Replace Response message with a cause value indicating that the replace request failed.

Accordingly, the same message DAR can be used for trigger replace and recall. The Device-Action commands and Device Notification commands include Attribute Value Pairs (AVPs) for providing information relevant to the commands. Thus, data delivered between the MTC-IWF 150 and the SCS 160 is may be provided in the form of AVPs having values set therein. However, the device trigger recall/replace can be new messages instead of new AVP of Action Type AVP.

Table 1 lists a few AVPs associated Device-Action commands and Device Notification commands according to an embodiment.

TABLE 1

| Device-Action AVP | Used By The SCS To Request A Specific Action For A Device |
|---|---|
| Device-Notification AVP | Used By The MTC-IWF To Report Any Action Requested By The SCS |
| Action-Type AVP | Informs The MTC-IWF Of What Action Type Is Asked For In The Request And Also Informs The SCS Of What Action Type Is Reported |

TABLE 1-continued

| Request-Status AVP | Informs The SCS Of The Status Of A Device-Action Request May Be Included In The Device-Action-Answer Command |
|---|---|
| Delivery-Outcome AVP | Informs The SCS Of The Outcome Of The Device-Action Request |
| Reference-Number AVP | Uniquely Identifies A Transaction; Allocated By The Initiator Of A Transaction And Is Used In Subsequent Messages Related To That Transaction |

As shown in Table 1, a Device-Action AVP is used by the SCS 160 to request a specific action for a device. A Device-Notification AVP is used by the MTC-IWF 150 to report any action requested by the SCS 160. An Action-Type AVP informs the MTC-IWF 150 of what action type is to be used in the request and also informs the SCS 160 of what action type is reported. A Request-Status AVP informs the SCS 160 of the status of a Device-Action Request. The Request-Status AVP can be included in the Device-Action-Answer command. A Delivery-Outcome AVP informs the SCS of the outcome of the Device-Action Request.

Table 2 lists the four values for the Action-Type AVP according to an embodiment. In Table 2, the information element name, the mapping to Diameter AVP and description are provided.

TABLE 2

| Information Element Name | Mapping to Diameter AVP | Description |
|---|---|---|
| Device Trigger Request | Action-Type | This Specifies A Device Trigger Request And Is Used In The Device-Action AVP Of The Device-Action Request Command And In The Device-Notification AVP Of The Device-Action Answer Command |
| Delivery Report | Action-Type | This Specifies That A Delivery Report Sent From MTC-IWF To The SCS |
| Trigger Recall Request | Action-Type | This Specifies That A Trigger Identified By A Trigger Reference Number Has To Be Deleted |
| Trigger Replacement Request | Action-Type | This Specifies That A Trigger Identified By A Trigger Reference Number Has To Be Replaced With the new Device Trigger Request |

The Action-Type AVP according to an embodiment now includes four values. The Action-Type AVPs includes a Device Trigger Request value and a Delivery Report value. However, two device trigger action requests are added to the available Action-Type AVPs according to an embodiment. The two device trigger action requests include a Device Trigger Recall Request value and a Device Trigger Replace Request value according to an embodiment.

The Device Trigger Request value indicates a device trigger request and is used in the Device-Action AVP of the Device-Action-Request command and in the Device-Notification AVP of the Device-Action-Answer command. The Delivery Report value indicates a delivery report sent from MTC-IWF to the SCS and is used in the Device-Notification AVP of the Device-Notification-Request command.

The Device Trigger Recall Request value has been added to the Device-Action AVP to indicate a device trigger recall request and is used in the Device-Action AVP of the Device-Action Request command A Device Trigger Replace Request value has been added to the Device-Action AVP to indicate a device trigger replace request and is used in the Device-Action AVP of the Device-Action Request command.

FIGS. 2a-c illustrate a Device-Action Request (DAR) command 200, a Device-Action Answer 260 and a Device-Notification Request 286 according to an embodiment. In FIG. 2a, the identification of the type of command is provided with the Diameter Header 210. The DAR command 200 also includes a session identification (ID) 212, authorized application ID 214, authorized session state 216, an identification of the origin-Host 218, the origin-Realm 220, the destination-Realm 222, the identification of the destination-Host 224, the origin-State ID 226 and the Device-Action AVP 228. As shown in FIG. 2a, the DAR 200 may include an added AVP for Trigger Recall Request flag, i.e., trigger deletion 240. The Trigger Recall Request flag 240 is used to specify to the MTC-IWF that a particular trigger is identified for deletion. The SCS can send a DAR command 200 to the MTC-IWF with the Action-Type AVP set to the value: Device Trigger Recall Request in order to request the recall of a specific trigger. The Reference-Number AVP discussed above with reference to Table 2 may be used to specify the trigger deletion.

The DAR may also use an added AVP providing Trigger Replace Request flag, i.e., trigger replacement 250. The Trigger Replace Request flag 250 is used to specify to the MTC-IWF that a particular trigger has to be replaced. The SCS can send a DAR command 200 to the MTC-IWF with the Action-Type AVP set to the value: Device Trigger Replace Request 250 in order to request the replacement of a specific trigger. The old reference-number AVP discussed above with reference to Table 2 may be used to specify which trigger has to be overwritten. A new reference number may be provided for the trigger to which it has to be replaced with.

FIG. 2b shows a Device-Action Answer command 260 according to an embodiment. Similar to the DAR command, the DAA messages may have new defined cause values that extend the available values to inform the SCS of the status of a Device-Action Request, e.g., success or failure. The Device-Action Answer command 260 includes a Result Code AVP 262 and a Device Notification AVP 262. The Result Code AVP may provide indication of the device trigger recall/replace, i.e., the device trigger recall 270 may be reported as successful 271 or a failure 272, and the device trigger replace 274 may be reported as successful 275 or a failure 276.

The Device-Notification AVP 262 may include an enhanced Action-Type AVP 278 that may include a value for the Device Trigger Recall Request 279 or the Device Trigger Replace Request 280. The Device-Notification AVP 262 may also include a Request-Status AVP 282 set to a value indicating the status of the device trigger request requested by the SCS, e.g., success 283, quota exceeded 284, rate exceeded 285, etc.

FIG. 2c shows a Device-Notification Request 286. The Device-Notification Request 286 includes a Device-Notification AVP 287. The Device-Notification AVP 287 may include a Request-Status AVP 288, i.e., a trigger delivery report, for informing the SCS of the status of the device trigger recall/replace request. The Request-Status AVP 288 has a value set to indicated the status of the device trigger recall/replace request, i.e., the device trigger recall 289 may be reported as successful 290 or a failure 291, and the device trigger replace 292 may be reported as successful 293 or a failure 294.

Figure 3:
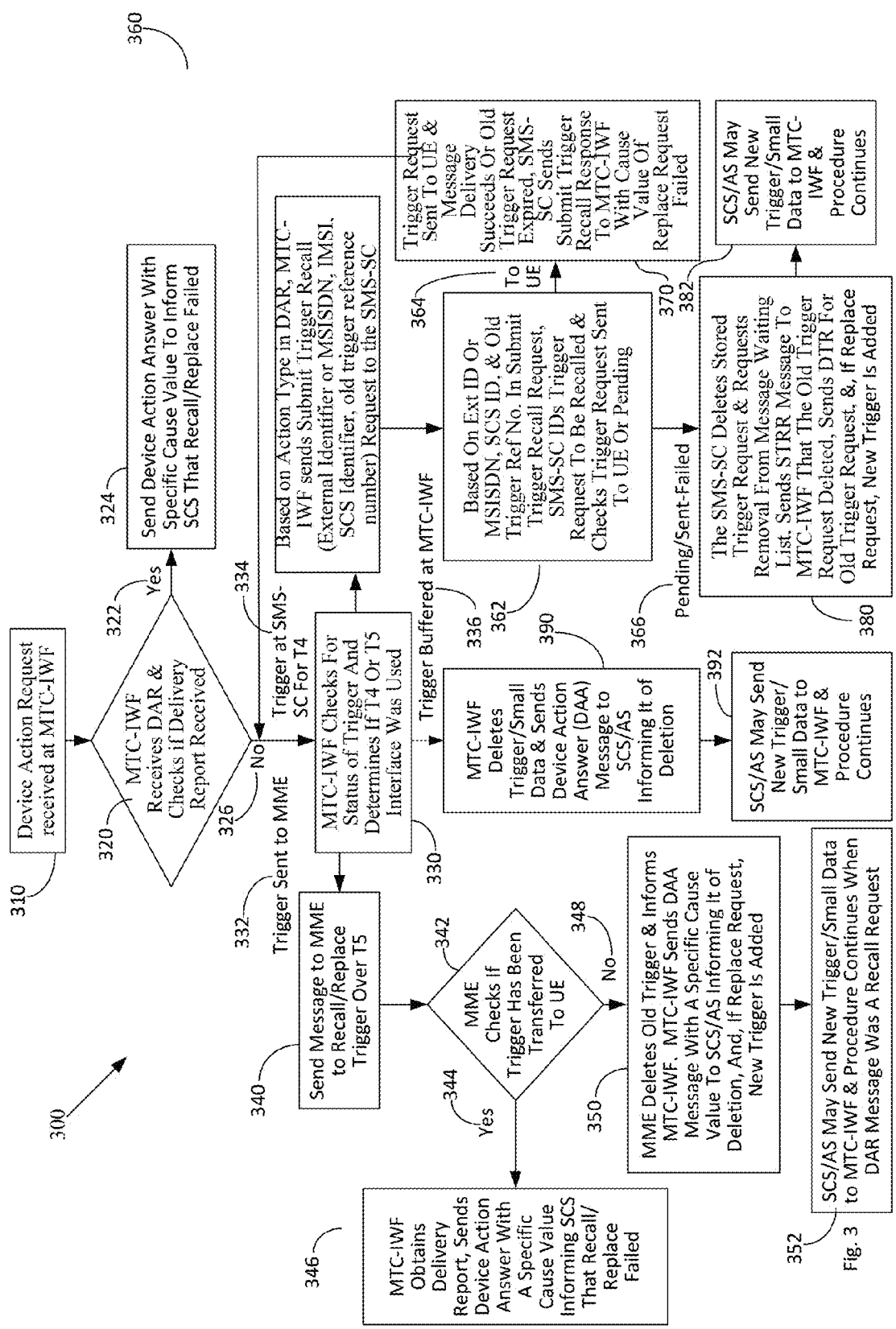
FIG. 3 is a flowchart illustrating the process involving the recall/replacement of a trigger according to an embodiment.

FIG. 3 is a flowchart 300 illustrating the process involving the recall/replacement of a trigger according to an embodiment. In FIG. 3, a Device-Action Request is received at the MTC-IWF 310. The Device-Action Request may include a recall request or a replace request. The recall and replace request identifies an old device trigger according to a device trigger reference number. The recall request is a request for the deletion of the old device trigger prior to being received by user equipment. The replace request includes a new device trigger and new device trigger reference number. The replace request asks for the old device trigger to be replaced by the new device trigger. While embodiments are described herein using device trigger requests, other messaging may also be used according to embodiments, e.g., small data transmissions, etc.

In response to receiving the DAR, the MTC-IWF determines whether a delivery report has been received regarding the trigger associated with the received DAR 320. If a delivery report has been received 322, this implies that previous submitted trigger has already been processed, therefore the MTC-IWF sends a Device-Action Answer (DAA) with specific cause value to the SCS to inform the SCS that the trigger recall/replacement failed 324. If a delivery report has not been received 326, the MTC-IWF determines the disposition of trigger and determines if the T4 or T5 interface was used for old device trigger delivery 330. In case of T5 device trigger, if the trigger is sent to the MME 332, the MTC-IWF sends a message to the MME to recall/replace the trigger 340. The MME determines whether the trigger has been transferred to the UE 342. If yes 344, the MTC-IWF obtains a delivery report from the MME indicating the trigger has already been sent to the UE and the MTC-IWF sends the SCS a Device-Action Answer (DAA) with specific cause value to inform the SCS that the recall/replacement failed 346.

If the MME determines that the trigger has been stored at MME and has not been transferred to the UE yet, e.g., the UE was not reachable, or in Idle mode) 348, the MME deletes the old device trigger and sends a delivery report to the MTC-IWF indicating deletion of the old device trigger and the MTC-IWF sends a DAA with specific cause value to the SCS to inform the SCS of the successful deletion of the old device trigger, and if the DAR was a recall request, a new device trigger request is added 350. If The DAR was a replace request, the SCS may then send a new device trigger request to the MTC-IWF, wherein the processing of the trigger continues 352.

If the MTC-IWF determines that the trigger is still buffered at the MTC-IWF 336, the MTC-IWF deletes the trigger and sends a DAA to the SCS informing the SCS of the deletion 390. The SCS may then send a new device trigger to the MTC-IWF, wherein the processing of the trigger continues 392.

In case of T4 device trigger, if the MTC-IWF determines that the trigger has been sent to the SMS-SC 334, the MTC-IWF sends a Submit Trigger Recall (External Identifier or MSISDN, IMSI, SCS Identifier, old device trigger reference number) message to the SMS-SC 360. Based on the External Identifier or MSISDN, SCS Identifier, and old device trigger reference number in the received Submit Trigger Recall Request, the SMS-SC identifies which trigger message is to be recalled and checks if the identified trigger message has been sent to the UE or is pending at SMS-SC 362.

If the trigger message is pending at SMS-SC or if the trigger message has been sent to the UE but this message delivery fails 366, the SMS-SC deletes the stored trigger message and requests the HSS to remove the SMS-SC address from the Message Waiting List, sends a Submit Trigger Recall Response message to the MTC-IWF to inform that the previously submitted trigger message has been successfully deleted in the SMS-SC, and sends a Trigger Delivery Report for the original trigger message indicating that this message has been recalled, and if DAR was a replace request, the identified new device trigger is added 380. The SCS may then send a new device trigger to the MTC-IWF, wherein the processing of the trigger continues 382.

If the trigger message has been sent to the UE and this message delivery succeeds or if the original trigger message has already expired 364, the SMS-SC sends a Submit Trigger Recall Response message to the MTC-IWF with a cause value indicating that the replace request failed 370, i.e., due to the successful delivery of the previously submitted trigger message or its expiration failed, i.e., due to the successful delivery of the previously submitted trigger message or its expiration.

Figure 4:
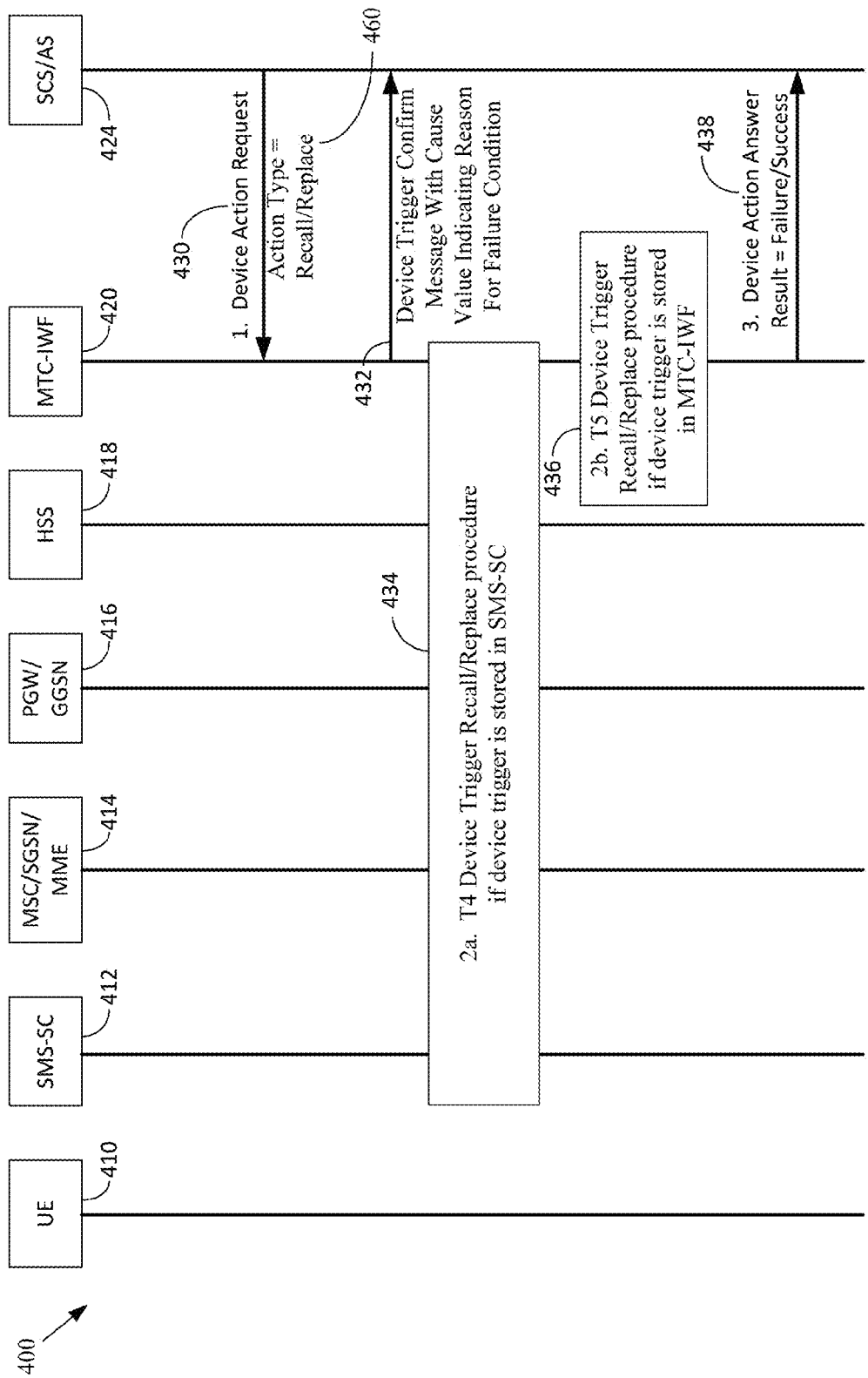
FIG. 4 illustrates a device trigger recall/replace procedure over Tsp according to an embodiment.

FIG. 4 illustrates a device trigger recall/replace procedure over Tsp 400 according to an embodiment. Those of ordinary skill in the art will recognize that while embodiments are described herein using device messages, other types of small data transmissions may also be used according to embodiments. In FIG. 4, a network includes UE 410, MSC/MME/SGSN/IP-SM-GW 414, SMS-SC/GMSC/IWMSC 416, HSS 418, and MTC-IWF 420. An SCS 424 determines it needs to recall/replace the previously submitted trigger message. The SCS 424 sends Device-Action Request (External Identifier or MSISDN, SCS Identifier, old device trigger reference number, new device trigger reference number, validity period, priority and trigger payload) message 430 with action type set to "Trigger Recall Request" or "Trigger Replace Request" 460.

The SCS 424 includes a new device trigger reference number, validity period, priority and trigger payload for trigger replace request only. The old device trigger reference number indicates the trigger reference number which was assigned to the previously submitted trigger message that the SCS 424 wants to cancel. The new device trigger reference number is assigned by the SCS 424 to the newly submitted trigger message. The MTC-IWF may reject the Device-Action Request with action type set to "Trigger Recall Request" or "Trigger Replace Request" sent by the SCS 424 if the SCS 424 has exceeded a limitation on a parameter associated with the SCS 424, e.g., the SCS 424 has exceeded its quota or rate of trigger submission over Tsp, by sending a Device Trigger Confirm message with a cause value indicating the reason for the failure condition 432, and the flow stops at this step.

When a trigger message that was not recalled or replaced is stored in SMS-SC 432, a T4 Device Trigger Recall/Replace procedure according to an embodiment is performed 434. When a trigger message that was not recalled or replaced is stored in MTC-IWF 420, a T5 Device Trigger Recall/Replace procedure according to an embodiment is performed 436. The MTC-IWF 420 indicates trigger recall/replace success or failure in Device-Action Answer message to the SCS 438.

When recall/replace of a trigger is successful, this is reflected in the "Device Trigger Report" of the original trigger message with delivery outcome "Recalled"/"Replaced." When recall/replace of a trigger fails because the trigger was already delivered or expired, a "Device Trigger Report" of the original trigger will already have been created with the appropriate delivery outcome.

Figure 5:
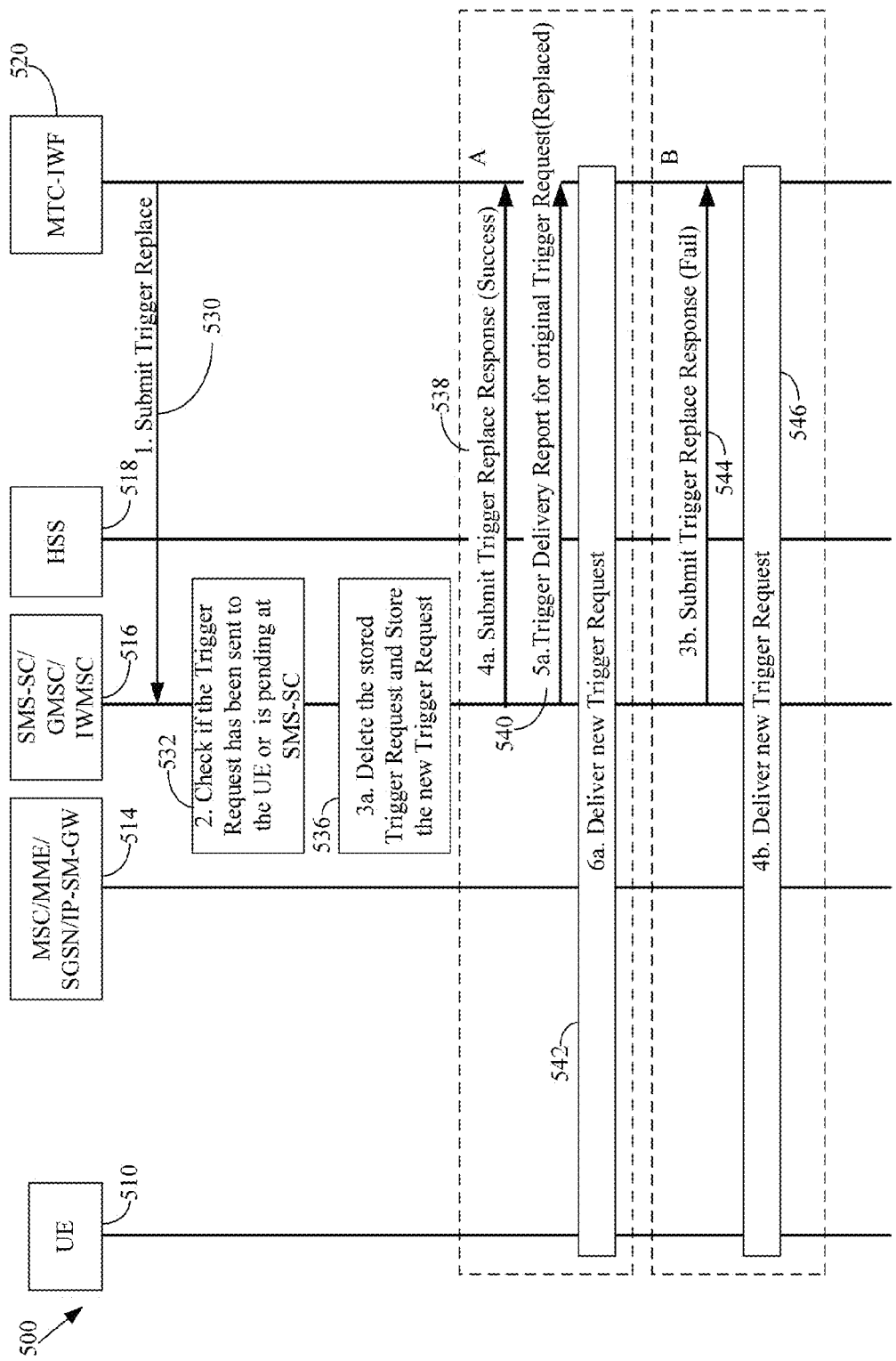
FIG. 5 illustrates a T4 Device Trigger Replace procedure according to an embodiment.

FIG. 5 illustrates a T4 Device Trigger Replace procedure 500 according to an embodiment. In FIG. 5, a network includes UE 510, MSC/MME/SGSN/IP-SM-GW 514, SMS-SC/GMSC/IWMSC 516, HSS 518, and MTC-IWF 520. Based on the Action type in Device-Action Request, the MTC-IWF sends a Submit Trigger Replace (External Identifier or MSISDN, IMSI, SCS Identifier, old device trigger reference number, new device trigger reference number, validity period, priority, trigger payload) message to the SMS-SC 530. The SMS-SC 516 identifies which trigger message is to be replaced based on the External Identifier or MSISDN, SCS Identifier, and old device trigger reference number in the received Submit Trigger Replace Request. The SMS-SC 516 checks 532 if the identified trigger message has been sent to the UE 510 or is pending at SMS-SC 516. When the trigger message is pending at SMS-SC or when the trigger message has been sent to the UE but this message delivery fails, the SMS-SC 516 deletes the stored trigger message and stores the new device trigger request 536 to deliver it when the UE is available. The SMS-SC 516 then sends 540 a Submit Trigger Replace Response message 538 to the MTC-IWF 520 to inform that the previously submitted trigger message has been successfully replaced by the new one in the SMS-SC 516. The SMS-SC 516 also sends a Trigger Delivery Report for the original trigger message 540 indicating that this message has been replaced. The SMS-SC 516 delivers the trigger message 542 to the UE 510 when the UE 510 is available.

However, when the trigger message has been sent to the UE and this message delivery succeeds or when the original trigger message has already expired, the SMS-SC 516 treats the new trigger message as a trigger message that it has to deliver to the UE 510. The SMS-SC 516 sends a Submit Trigger Replace Response message 544 to the MTC-IWF 520 to inform that the previously submitted trigger message has been successfully delivered and the SMS-SC 516 shall deliver the new trigger message. The new trigger message is delivered 546 to the UE 510.

Figure 6:
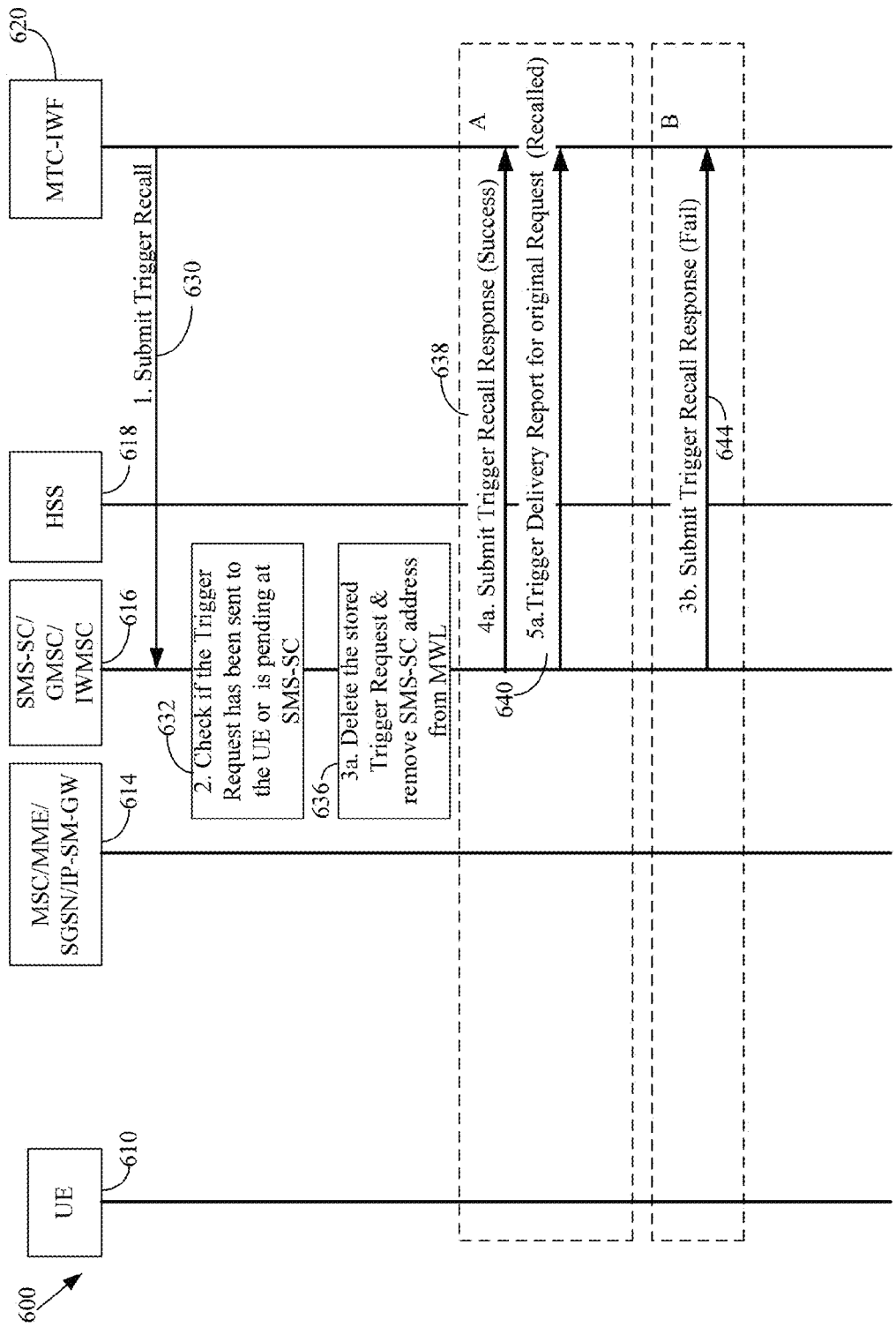
FIG. 6 illustrates a T4 Device Trigger Recall procedure according to an embodiment

FIG. 6 illustrates a T4 Device Trigger Recall procedure 600 according to an embodiment. In FIG. 6, a network includes UE 610, MSC/MME/SGSN/IP-SM-GW 614, SMS-SC/GMSC/IWMSC 616, HSS 618, and MTC-IWF 620. The MTC-IWF 620 sends a Submit Trigger Recall (External Identifier or MSISDN, IMSI, SCS Identifier, old device trigger reference number) message 630 to the SMS-SC 616 based on the Action type in Device-Action Request. The SMS-SC 616 identifies which trigger message is to be recalled based on the External Identifier or MSISDN, SCS Identifier, and old device trigger reference number in the received Submit Trigger Recall Request. The SMS-SC 616 checks 632 if the identified trigger message has been sent to the UE 610 or is pending at SMS-SC 616.

When the trigger message is pending at SMS-SC 616 or when the trigger message has been sent to the UE 610 but this message delivery fails, the SMS-SC 616 deletes the stored trigger message and requests the HSS 618 to remove the SMS-SC 616 address from the Message Waiting List 636. The SMS-SC 616 then sends a Submit Trigger Recall Response message 638 to the MTC-IWF 620 to inform that the previously submitted trigger message has been successfully deleted in the SMS-SC 616. The SMS-SC 616 also sends a Trigger Delivery Report for the original trigger message indicating that this message has been recalled 640.

When the trigger message has been sent to the UE 610 and this message delivery succeeds or when the original trigger message has already expired, the SMS-SC 616 sends a Submit Trigger Recall Response message to the MTC-IWF 620 with a cause value indicating that the replace request failed 644, i.e., due to the successful delivery of the previously submitted trigger message or its expiration failed, i.e., due to the successful delivery of the previously submitted trigger message or its expiration.

Figure 7:
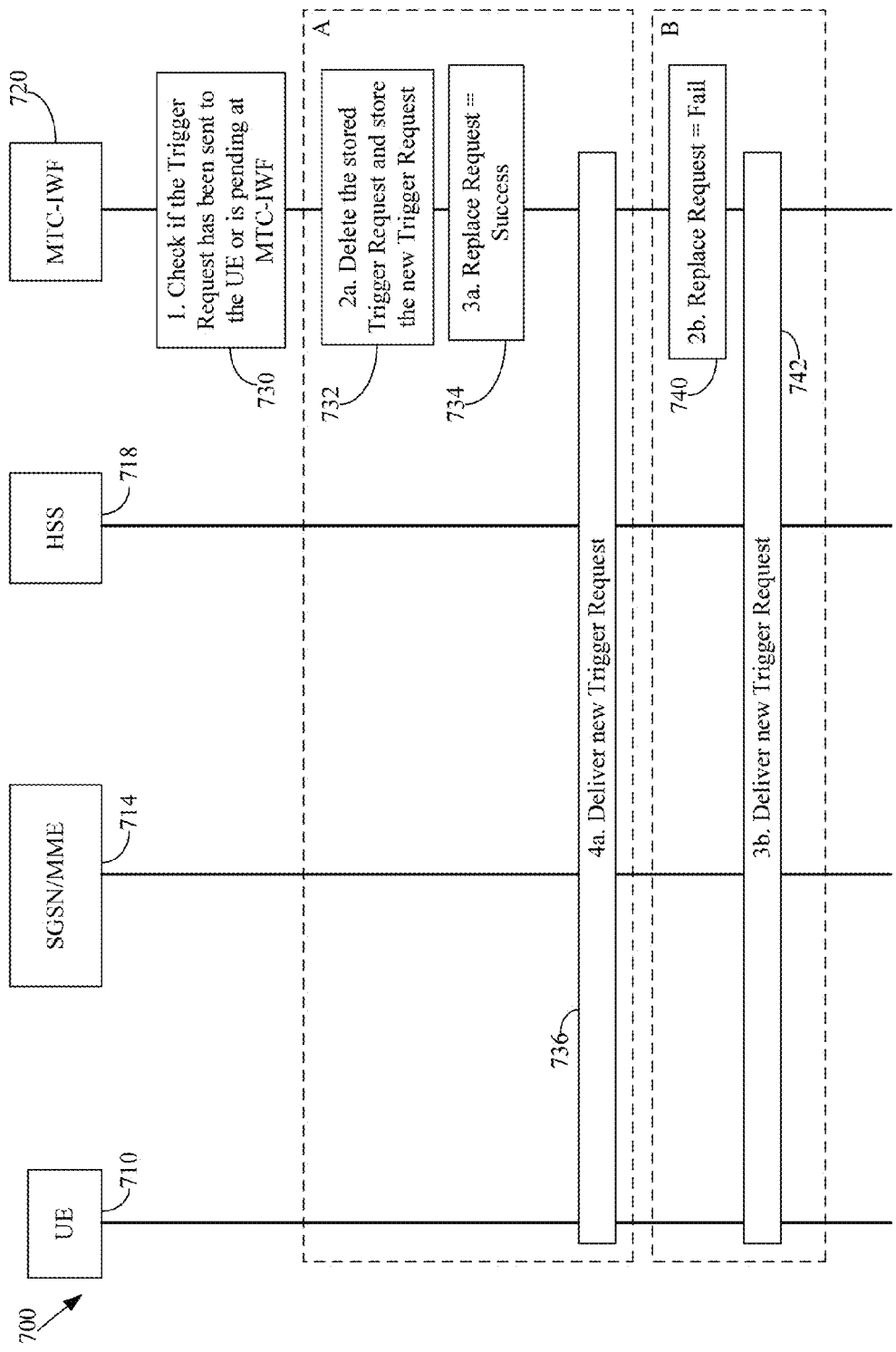
FIG. 7 illustrates a T5 Device Trigger Replace procedure according to an embodiment.

FIG. 7 illustrates a T5 Device Trigger Replace procedure 700 according to an embodiment. In FIG. 7, a network includes UE 710, SGSN/MME 714, HSS 718, and MTC-IWF 720. The MTC-IWF 720 identifies which trigger message is to be replaced based on the External Identifier or MSISDN, SCS Identifier, and old device trigger reference number in the received Submit Trigger Replace Request. The MTC-IWF 720 checks 730 if the identified trigger message has been sent to the UE 720 or is pending at MTC-IWF 720.

When the trigger message is pending at MTC-IWF 720 or when the trigger message has been sent to the UE 710 but this message delivery fails, the MTC-IWF 720 deletes the stored trigger message and stores the new trigger message 732 to deliver it when the UE 710 is available. It is considered that the previously submitted trigger message has been successfully replaced 734 in the MTC-IWF 720. The new trigger message will be delivered 736 to the UE 710 when the UE 710 is available.

When the trigger message has been sent to the UE 710 and this message delivery succeeds or when the original trigger message has already expired, the MTC-IWF 720 treats the new trigger message as a trigger message that it has to deliver to the UE 710. It is considered that the replace request has failed 740, i.e., due to the successful delivery of the previously submitted trigger message or its expiration. The new trigger message will be delivered 742 to the UE 710 when the UE 710 is available.

Figure 8:
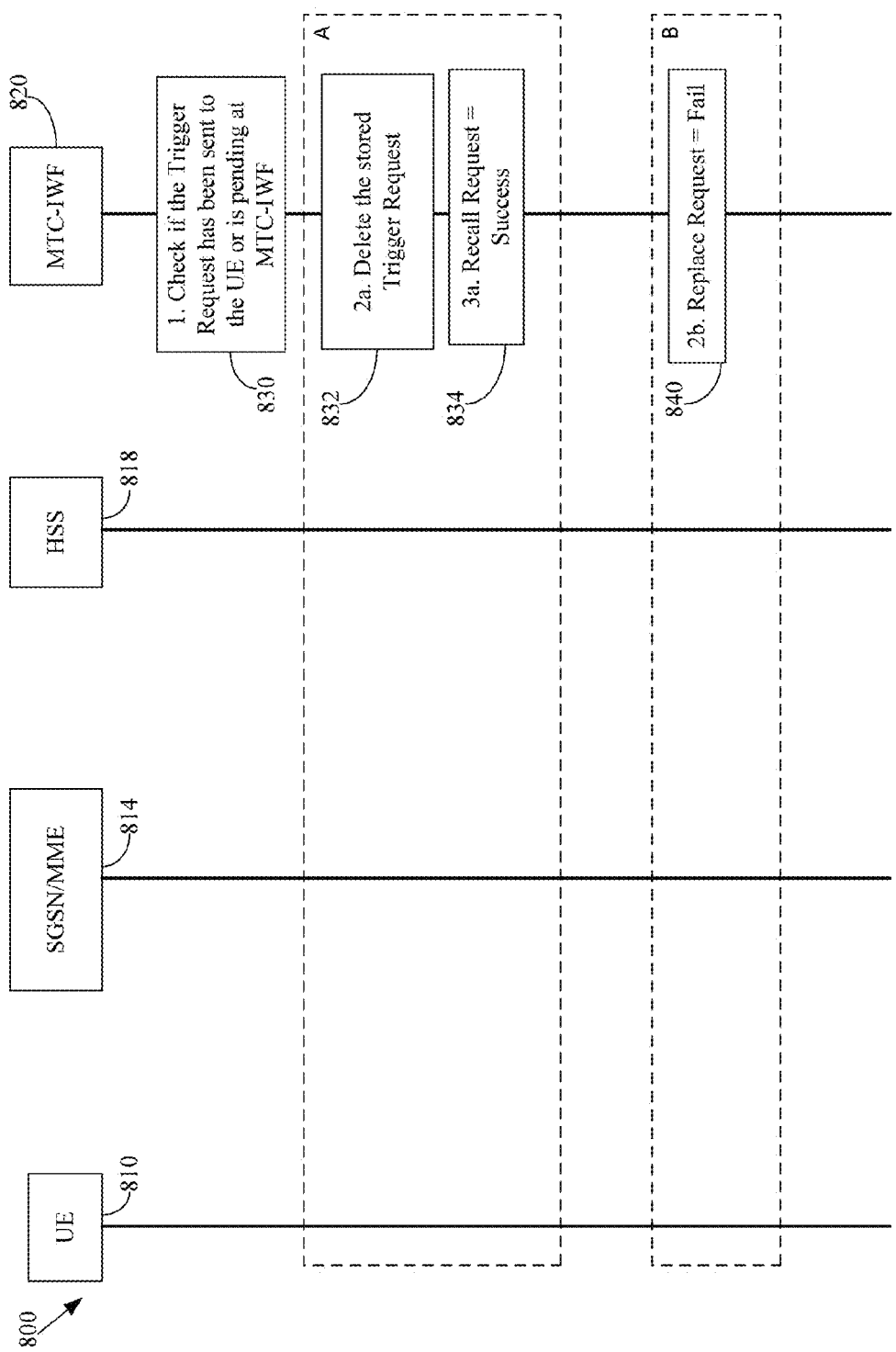
FIG. 8 illustrates a T5 Device Trigger Replace procedure according to an embodiment.

FIG. 8 illustrates a T5 Device Trigger Replace procedure 800 according to an embodiment. In FIG. 8, a network includes UE 810, SGSN/MME 814, HSS 818, and MTC-IWF 820. The MTC-IWF 820 identifies which trigger message is to be recalled. The MTC-IWF 820 checks if the identified trigger message has been sent to the UE or is pending 830 at MTC-IWF based on the External Identifier or MSISDN, SCS Identifier, and old device trigger reference number in the received Submit Trigger Recall Request.

When the trigger message is pending at MTC-IWF or when the trigger message has been sent to the UE 810 but this message delivery fails, the MTC-IWF 820 deletes the stored trigger message 832. When the MTC-IWF 820 has previously registered for UE reachability notification, MTC-IWF 820 de-register from UE 810 reachability notification at HSS 818. It is considered that the previously submitted trigger message has been successfully deleted 834 in the MTC-IWF 820.

When the trigger message has been sent to the UE 810 and this message delivery succeeds or when the original trigger message has already expired, it is considered that the recall request has failed 840, i.e., due to the successful delivery of the previously submitted trigger message or its expiration.

Figure 9:
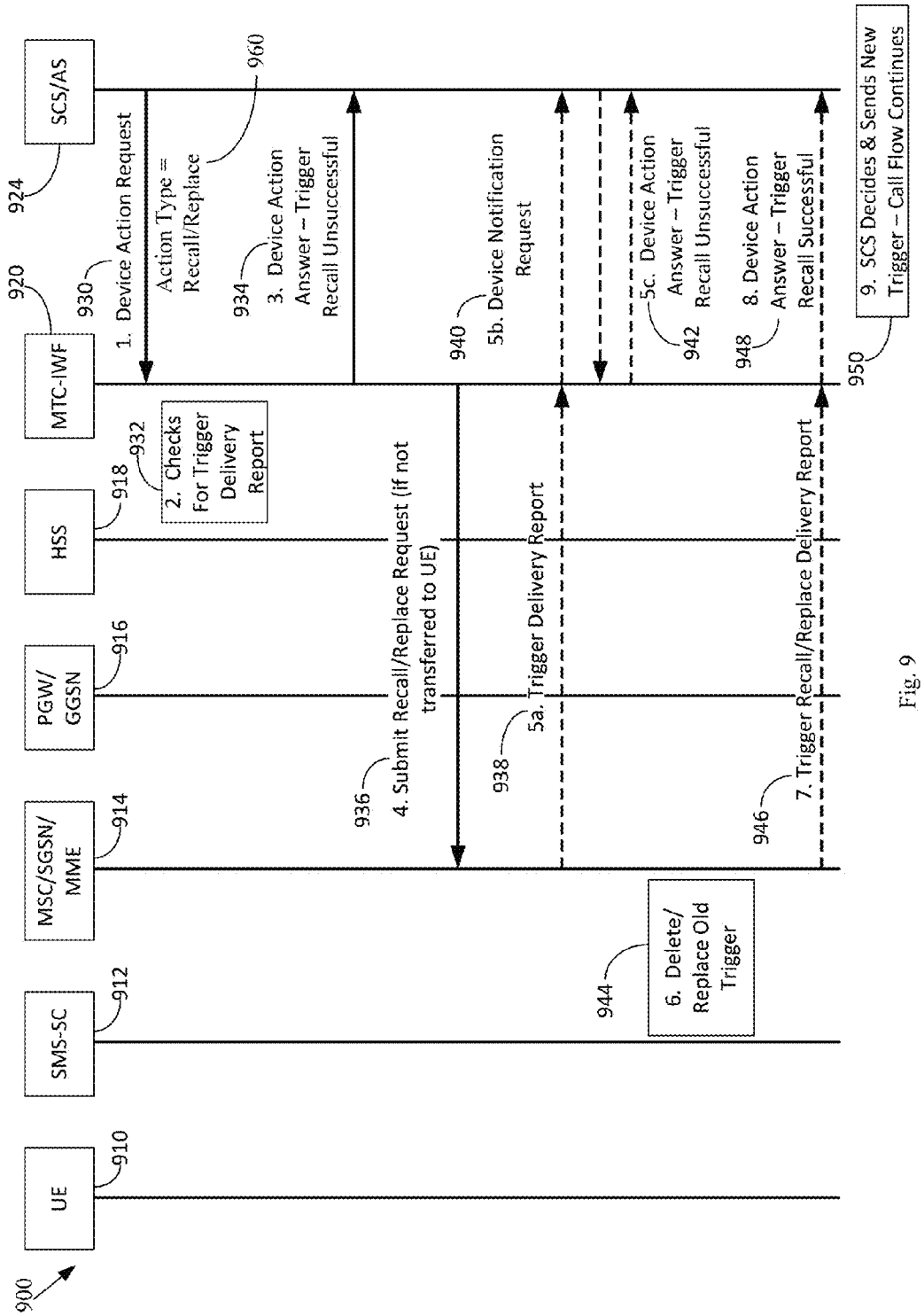
FIG. 9 illustrates a call flow for a trigger recall at a MME/MSC/SGSN according to an embodiment.

FIG. 9 illustrates a call flow 900 for a trigger recall at a MME/MSC/SGSN according to an embodiment. In FIG. 9, a network includes UE 910, SMS-SC 912, MSC/SGSN/MME 914, PGW/GGSN 916, HSS 918, MTC-IWF 920 and SCS/AS 924. If the SCS/AS 924 has not received the Delivery Notification Answer (DNA) message, the SCS/AS 924 may send a Device-Action Request (DAR) command 930 to the MTC-IWF 920 with the Action-Type AVP set to the value device trigger recall request 960 and other AVPs set as appropriate. The DAR 930 identifies the trigger the SCS/AS 924 is requesting to be recalled. The MTC-IWF 920 checks for a trigger delivery notification or delivery report associated with the identified trigger 932. If the MTC-IWF has received a notification that trigger has been delivered to UE, the MTC-IWF 920 sends the SCS/AS 924 a Device-Action Answer (DAA) command 934 with the Action-Type AVP set to the value: Device Trigger Recall/Replace Request and the Request-Status AVP is set to a value indicating that the trigger recall was unsuccessful because the trigger has already been acted on by the UE 910.

However, if the MTC-IWF 920 determines that that the trigger is not buffered at the MTC-IWF 920 and that the trigger has not been transferred to the UE 910, the MTC-IWF 920 sends a message 936 over a T5 interface to the MME 914 to recall/replace the trigger. The Submit Request message 936 is enhanced in order to specify a trigger recall or trigger replacement. The MME 914 determines whether the trigger has been transferred to the UE 910. When the MME 914 determines that the trigger has been sent to the UE 910, then the MME 914 issues a trigger delivery report 938 to MTC-IWF 920. The MTC-IWF 920 sends a device notification request 940 to inform the SCS/AS 922 that the trigger recall was unsuccessful. The MTC-IWF 920 also sends a DAA 942 to inform SCS/AS 924 that trigger recall/replace request has failed.

When the MME 914 determines that the trigger is buffered at the MME 914, the MME 914 deletes the trigger 944. Then, the MME 914 informs MTC-IWF 920 of trigger deletion success 946. The MTC-IWF 924 sends a DAA 948 indicating to the SCS/AS 924 that the trigger was deleted. The SCS/AS 922 determines whether a new trigger is to be sent and sends a new trigger, wherein flow continues normally 950.

Figure 10:
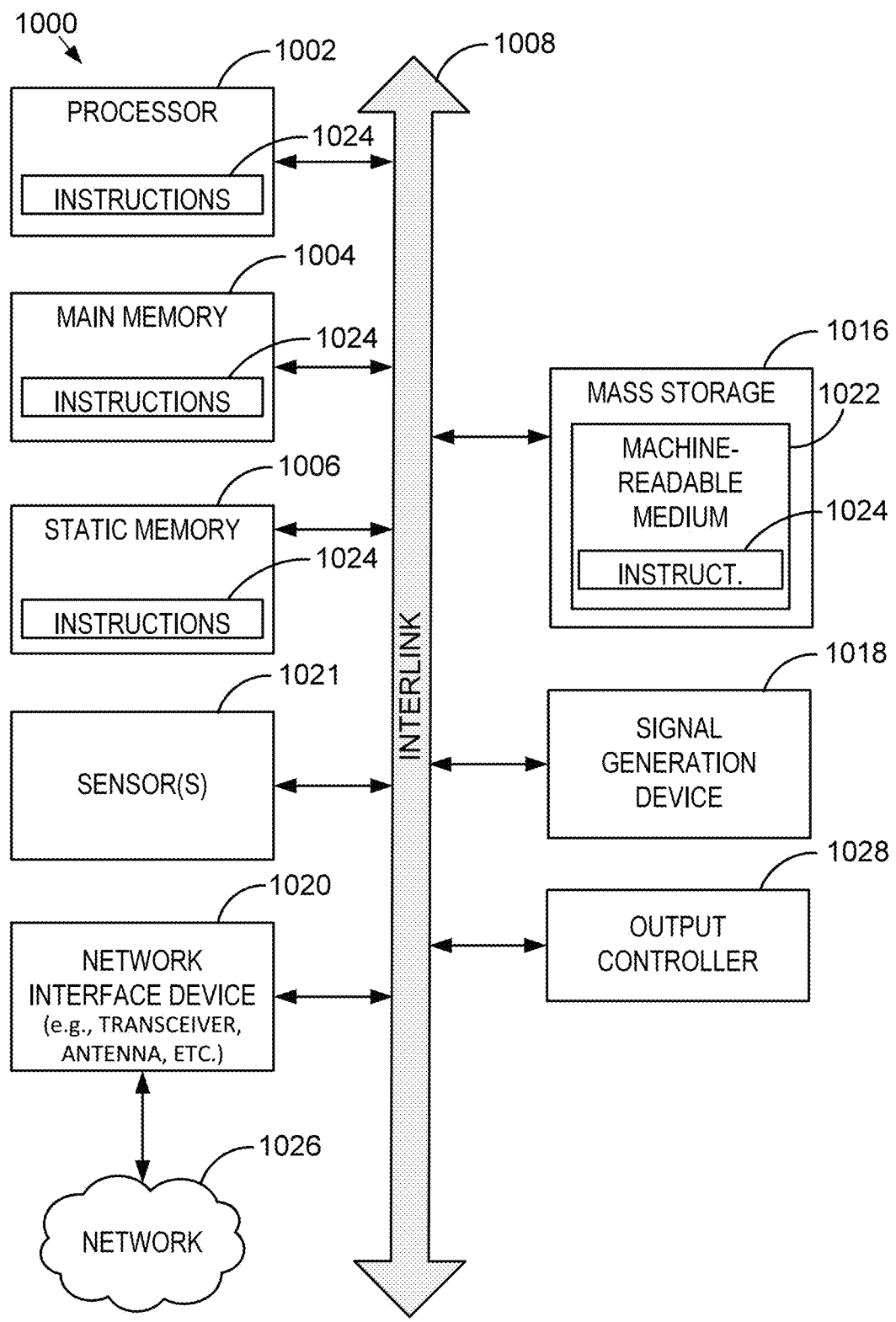
FIG. 10 illustrates a block diagram of an example machine for managing device trigger action requests according to an embodiment.

FIG. 10 illustrates a block diagram of an example machine 1000 for managing device trigger action requests according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may additionally include a storage device (e.g., drive unit) 1016, a signal generation device 1018 (e.g., a speaker), a network interface device 1020, e.g., a transceiver, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless, e.g., radio frequency (RF), infrared (IR), connection.

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020, such as a transceiver, utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a transceiver and a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes & Examples

Example 1 may include subject matter (such as a method or means for performing acts) including receiving, at a network entry point node, a Device-Action Request command from an external services capability server with an action type attribute value pair set to indicate a device trigger action request for performing an action on an old device trigger request;

determining, by the network entry point node, a status of the old device trigger request from the external services capability server; and sending, by the network entry point node, a response message to the external services capability server indicating status of device trigger action request.

Example 2 may optionally include the subject matter of Example 1, wherein the sending the response message comprises sending a Device-Action Answer command having a cause value set to report a status of the device trigger action request.

Example 3 may optionally include the subject matter of any one or more of Examples 1-2, wherein the sending the Device-Action Answer command having a cause value set to report a status of the device trigger action request comprises sending a Device-Action Answer command having a cause value set to report a success of a recall request for the old device trigger request.

Example 4 may optionally include the subject matter of any one or more of Examples 1-3, wherein the sending the Device-Action Answer command having a cause value set to report a status of the device trigger action request comprises sending a Device-Action Answer command having a cause value set to report failure of a recall request for the old device trigger request.

Example 5 may optionally include the subject matter of any one or more of Examples 1-4, wherein the sending the Device-Action Answer command having a cause value set to report a status of the device trigger action request comprises sending a Device-Action Answer command having a cause value set to report a success of a replace request for the old device trigger request, the old device trigger being replace with a new trigger provided in the Device-Action Request.

Example 6 may optionally include the subject matter of any one or more of Examples 1-5, wherein the sending the Device-Action Answer command having a cause value set to report a status of the device trigger action request comprises sending a Device-Action Answer command having a cause value set to report failure of a replace request for the old device trigger request, the old device trigger being requested to be replaced with a new trigger provided in the Device-Action Request.

Example 7 may optionally include the subject matter of any one or more of Examples 1-6, wherein the sending the response message comprises sending a device trigger report associated with the old device trigger request indicating a status of the old device trigger request in response to the device trigger action request.

Example 8 may optionally include the subject matter of any one or more of Examples 1-7, wherein the sending the response message comprises sending a device trigger confirm message having a cause value set to indicate the Device-Action Request exceeds a limitation on a parameter associated with the external services capability server.

Example 9 may optionally include the subject matter of any one or more of Examples 1-8, further comprising sending from the network entry point node to a store and forward center, based on the Device-Action Request, a submit trigger replace request including an old device trigger reference number for identifying the old device trigger request and a new trigger reference number identifying a substitute trigger request.

Example 10 may optionally include the subject matter of any one or more of Examples 1-9, further comprising receiving, at the network entry point node, a submit trigger replace response message indicating success or failure of the submit trigger replace request.

Example 11 may optionally include the subject matter of any one or more of Examples 1-10, further comprising receiving, at the network entry point node, a trigger delivery report associated with the old device trigger request from the store and forward center indicating the old device trigger request has been replaced.

Example 12 may optionally include the subject matter of any one or more of Examples 1-11, further comprising sending from the network entry point node to a store and forward center, based on the Device-Action Request, a submit trigger recall request including an old device trigger reference number for identifying the old device trigger request.

Example 13 may optionally include the subject matter of any one or more of Examples 1-12, further comprising receiving, at the network entry point node, a submit trigger recall response message indicating success or failure of the submit trigger recall request.

Example 14 may optionally include the subject matter of any one or more of Examples 1-13, further comprising receiving, at the network entry point node, a trigger delivery report associated with the old device trigger request from the store and forward center indicating the old device trigger request has been recalled.

Example 15 may optionally include the subject matter of any one or more of Examples 1-14, wherein the receiving the Device-Action Request command with the action type attribute value pair set to indicate the device trigger action request comprises receiving a device trigger replace request, wherein the method further comprises determining when an old device trigger request is pending at the network entry point node or has been unsuccessfully sent to an user equipment, deleting the old device trigger request, storing a new trigger request provided by the Device-Action Request command and delivering the new trigger request when the user equipment becomes available.

Example 16 may optionally include the subject matter of any one or more of Examples 1-15, wherein the receiving the Device-Action Request command with the action type attribute value pair set to indicate the device trigger action request comprises receiving a device trigger replace request, wherein the method further comprises determining when an old device trigger request is pending at the network entry point node or has been unsuccessfully sent to a user equipment, deleting the old device trigger request, storing a new trigger request provided by the Device-Action Request command and delivering the new trigger request when the user equipment becomes available, and determining when the old device trigger request has been successfully sent to the user equipment or the old device trigger request has expired, considers the device trigger replace request failed and delivering the new device trigger request to the user equipment when the user equipment becomes available.

Example 17 may optionally include the subject matter of any one or more of Examples 1-16, wherein the receiving the Device-Action Request command with the action type attribute value pair set to indicate the device trigger action request comprises receiving a device trigger recall request, wherein the method further comprises determining when an old device trigger request is pending at the network entry point node or has been unsuccessfully sent to a user equipment, deleting the old device trigger request, de-registering from user equipment reachability notification at a management database and considering the old device trigger request has successfully been deleted, and determining when the old device trigger request has been successfully sent to the user equipment or the old device trigger request has expired, considers the device trigger recall request failed.

Example 18 may include subject matter (such as a device, apparatus, client or system) including a transceiver arranged to establish a connection with core network entities and an external services capability server providing machine type communication for user equipment supported by the core network entities, the transceiver arranged to receive a Device-Action Request command from an external services capability server with an action type attribute value pair set to indicate a device trigger action request for performing an action on an old device trigger request; and a processor arranged to determine a status of the old device trigger request from the external services capability server and to send a response message to the external services capability server indicating status of device trigger action request.

Example 19 may optionally include the subject matter of Example 14, wherein the response message comprises a Device-Action Answer command having a cause value set to report a status of the device trigger action request.

Example 20 may optionally include the subject matter of any one or more of Examples 14-15, wherein the Device-Action Answer command comprises a cause value set to report a success of a recall request for the old device trigger request when an old device trigger request is deleted, a cause value set to report failure of a recall request for the old device trigger request when the old device trigger request has been successfully delivered to a user equipment or has already expired, a cause value set to report a success of a replace request for the old device trigger request, the old device trigger request being replaced with a new trigger request provided in the Device-Action Request, and a cause value set to report failure of a replace request for the old device trigger request, the old device trigger request being requested to be replaced with a new trigger request provided in the Device-Action Request.

Example 21 may optionally include the subject matter of any one or more of Examples 14-16, wherein the response message comprises a device trigger report associated with the old device trigger request indicating a status of the old device trigger request in response to the device trigger action request.

Example 22 may optionally include the subject matter of any one or more of Examples 14-17, wherein the response message comprises a device trigger confirm message having a cause value set to indicate the Device-Action Request exceeds a limitation on a parameter associated with the external services capability server.

Example 23 may optionally include the subject matter of any one or more of Examples 14-18, wherein the processor is arranged to send to a store and forward center send via the transceiver, based on the Device-Action Request, a submit trigger replace request including an old device trigger reference number for identifying the old device trigger request and a new trigger reference number identifying a substitute trigger request, a submit trigger recall request including an old device trigger reference number for identifying the old device trigger request, and is arranged to receive via the transceiver a submit trigger replace response message indicating success or failure of the submit trigger replace request, a submit trigger recall response message indicating success or failure of the submit trigger recall request, and a trigger delivery report associated with the old device trigger request from the store and forward center indicating the old device trigger request has been recalled.

Example 24 may optionally include the subject matter of any one or more of Examples 14-19, wherein the processor is arranged to process a received device trigger replace request, to determine when an old device trigger request is pending at the network entry point node or has been unsuccessfully sent to an user equipment, to delete the old device trigger request, to store a new trigger request provided by the Device-Action Request command and to deliver the new trigger request when the user equipment becomes available.

Example 25 may optionally include the subject matter of any one or more of Examples 14-20, wherein the processor is arranged to process a received device trigger replace request, to determine when an old device trigger request is pending at the network entry point node or has been unsuccessfully sent to a user equipment, to delete the old device trigger request, to store a new device trigger request provided by the Device-Action Request command and to deliver the new device trigger request when the user equipment becomes available, the processor being further arranged to determine when the old device trigger request has been successfully sent to the user equipment or the old device trigger request has expired that the device trigger replace request failed and to deliver the new device trigger request to the user equipment when the user equipment becomes available.

Example 26 may optionally include the subject matter of any one or more of Examples 14-21, wherein the processor is arranged to process a received device trigger recall request, to determine when an old device trigger request is pending at the network entry point node or has been unsuccessfully sent to a user equipment, to delete the old device trigger request, to de-register from user equipment reachability notification at a management database when the old device trigger request has successfully been deleted, and to determine that the device trigger recall request failed when the old device trigger request has been successfully sent to the user equipment or the old device trigger request has expired.

Example 27 may include subject matter (such as means for performing acts or machine readable medium including instructions that, when executed by the machine, cause the machine to perform acts) including receiving, at a network entry point node, a Device-Action Request command from an external services capability server with an action type attribute value pair set to indicate a device trigger action request for performing an action on an old device trigger request;

determining, by the network entry point node, a status of the old device trigger request from the external services capability server; and sending, by the network entry point node, a response message to the external services capability server indicating status of device trigger action request.

Example 28 may optionally include the subject matter of Example 27, wherein the sending the response message comprises sending a Device-Action Answer command having a cause value set to report a status of the device trigger action request, the sending the Device-Action Answer command having a cause value set to report a status of the device trigger action request further comprising sending a Device-Action Answer command having a cause value set to report a success of a recall request for the old device trigger request, sending a Device-Action Answer command having a cause value set to report failure of a recall request for the old device trigger request, sending a Device-Action Answer command having a cause value set to report a success of a replace request for the old device trigger request, the old device trigger being replace with a new device trigger provided in the Device-Action Request and sending a Device-Action Answer command having a cause value set to report failure of a replace request for the old device trigger request, the old device trigger being requested to be replaced with a new device trigger provided in the Device-Action Request.

Example 29 may optionally include the subject matter of any one or more of Examples 27-28, wherein the sending the response message comprises sending a device trigger report associated with the old device trigger request indicating a status of the old device trigger request in response to the device trigger action request and sending a device trigger confirm message having a cause value set to indicate the Device-Action Request exceeds a limitation on a parameter associated with the external services capability server.

Example 30 may optionally include the subject matter of any one or more of Examples 27-29, further comprising sending from the network entry point node to a store and forward center, based on the Device-Action Request, a submit trigger replace request including an old device trigger reference number for identifying the old device trigger request and a new device trigger reference number identifying a substitute trigger request, receiving, at the network entry point node, a submit trigger replace response message indicating success or failure of the submit trigger replace request and receiving, at the network entry point node, a trigger delivery report associated with the old device trigger request from the store and forward center indicating the old device trigger has been replaced.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for managing device trigger action requests, comprising:

receiving, at a network entry point node, a Device-Action Request command from an external services capability server with an action type attribute value pair set to indicate a device trigger action request for performing an action on an old device trigger request;

determining, by the network entry point node, a status of the old device trigger request from the external services capability server; and sending, by the network entry point node, a response message to the external services capability server indicating a status of device trigger action request, wherein the sending the response message comprises sending a Device-Action Answer command having a cause value set to report a status of the device trigger action request.

2. The method of claim 1, wherein the sending the Device-Action Answer command having a cause value set to report a status of the device trigger action request comprises sending a Device-Action Answer command having a cause value set to report success of a replace request for the old device trigger request, the old device trigger being replaced with a new trigger provided in the Device-Action Request.

3. The method of claim 1, wherein the sending the Device-Action Answer command having a cause value set to report a status of the device trigger action request comprises sending a Device-Action Answer command having a cause value set to report failure of a replace request for the old device trigger request, the old device trigger being requested to be replaced with a new trigger provided in the Device-Action Request.

4. The method of claim 1, wherein the sending the response message comprises sending a device trigger report associated with the old device trigger request indicating a status of the old device trigger request in response to the device trigger action request.

5. The method of claim 1, wherein the sending the response message comprises sending a device trigger confirm message having a cause value set to indicate the Device-Action Request exceeds a limitation on a parameter associated with the external services capability server.

6. The method of claim 1, further comprising sending from the network entry point node to a store and forward center, based on the Device-Action Request, a submit trigger replace request including an old device trigger reference number for identifying the old device trigger request and a new trigger reference number identifying a substitute trigger request.

7. The method of claim 6 further comprising receiving, at the network entry point node, one selected from a group consisting of:
a submit trigger replace response message indicating success or failure of the submit trigger replace request, and
a trigger delivery report associated with the old device trigger request from the store and forward center indicating the old device trigger request has been replaced.

8. The method of claim 1 further comprising sending from the network entry point node to a store and forward center, based on the Device-Action Request, a submit trigger recall request including an old device trigger reference number for identifying the old device trigger request.

9. The method of claim 8 further comprising receiving, at the network entry point node, a submit trigger recall response message indicating success or failure of the submit trigger recall request and a trigger delivery report associated with the old device trigger request from the store and forward center indicating the old device trigger request has been recalled.

10. The method of claim 1, wherein:
the receiving the Device-Action Request command with the action type attribute value pair set to indicate the device trigger action request comprises receiving a device trigger replace request, and
the method further comprises, in response to determining that the old device trigger request is pending at the network entry point node or has been unsuccessfully sent to a user equipment:
deleting the old device trigger request,
storing a new trigger request provided by the Device-Action Request command, and
delivering the new trigger request when the user equipment becomes available.

11. The method of claim 10, wherein the method further comprises:
determining, in response to determining that the old device trigger request has been successfully sent to the user equipment or the old device trigger request has expired, that the device trigger replace request has failed, and
after determining that the device trigger replace request has failed, delivering the new trigger request to the user equipment when the user equipment becomes available.

12. The method of claim 1, wherein:
the receiving the Device-Action Request command with the action type attribute value pair set to indicate the device trigger action request comprises receiving a device trigger recall request, and
the method further comprises, in response to determining that an old device trigger request is pending at the network entry point node or has been unsuccessfully sent to a user equipment;
deleting the old device trigger request,
de-registering from a user equipment reachability notification at a management database and considering that the old device trigger request has successfully been deleted, and
determining, in response to determining that the old device trigger request has been successfully sent to the user equipment or the old device trigger request has expired, that the device trigger recall request has failed.

13. A network entry point node, comprising:
a transceiver arranged to establish a connection with core network entities and an external services capability server providing machine type communication for user equipment supported by the core network entities, the transceiver arranged to receive a Device-Action Request command from an external services capability server with an action type attribute value pair set to indicate a device trigger action request for performing an action on an old device trigger request; and
a processor arranged to determine a status of the old device trigger request from the external services capability server and to send a response message to the external services capability server indicating status of device trigger action request,
wherein the response message comprises one selected from a group comprising:
a Device-Action Answer command having a cause value set to report a status of the device trigger action request,
a device trigger report associated with the old device trigger request indicating a status of the old device trigger request in response to the device trigger action request, and
a device trigger confirm message having a cause value set to indicate the Device-Action Request exceeds a limitation on a parameter associated with the external services capability server.

14. The network entry point node of claim 13, wherein the response message comprises a Device-Action Answer command having a cause value set to report a status of the device trigger action request.

15. The network entry point node of claim 14, wherein the Device-Action Answer command comprises:
a cause value set to report success of a recall request for the old device trigger request when the old device trigger request is deleted,
a cause value set to report failure of the recall request for the old device trigger request when the old device trigger request has been successfully delivered to a user equipment or has already expired,
a cause value set to report success of a replace request for the old device trigger request when the old device trigger request is replaced with a new trigger request provided in the Device-Action Request, and
a cause value set to report failure of the replace request for the old device trigger request when the old device trigger request has been successfully delivered to a user equipment or has already expired, the old device trigger request being requested to be replaced with the new trigger request provided in the Device-Action Request.

16. The network entry point node of claim 13, wherein the response message comprises one selected from a group comprising:
a device trigger report associated with the old device trigger request indicating a status of the old device trigger request in response to the device trigger action request, and
a device trigger confirm message having a cause value set to indicate the Device-Action Request exceeds a limitation on a parameter associated with the external services capability server.

17. The network entry point node of claim 13, wherein the processor is arranged to:
send to a store and forward center send via the transceiver, based on the Device-Action Request:
a submit trigger replace request including an old device trigger reference number for identifying the old device trigger request and a new trigger reference number identifying a substitute trigger request, and
a submit trigger recall request including the old device trigger reference number for identifying the old device trigger request, and
receive via the transceivers:
a submit trigger replace response message indicating success or failure of the submit trigger replace request,
a submit trigger recall response message indicating success or failure of the submit trigger recall request, and
a trigger delivery report associated with the old device trigger request from the store and forward center indicating the old device trigger request has been recalled.

18. The network entry point node of claim 13, wherein the processor is arranged to:
process a received device trigger replace request, and in response to determining that an old device trigger request is pending at the network entry point node or has been unsuccessfully sent to a user equipment:
delete the old device trigger request,
store a new trigger request provided by the Device-Action Request command, and
deliver the new trigger request when the user equipment becomes available.

19. The network entry point node of claim 18, wherein the processor is further arranged to:
determine, when the old device trigger request has been successfully sent to the user equipment or the old device trigger request has expired, that the device trigger replace request failed, and
after determining that the device trigger replace request has failed, deliver the new device trigger request to the user equipment when the user equipment becomes available.

20. The network entry point node of claim 13, wherein the processor is arranged to:
process a received device trigger recall request, and in response to determining that an old device trigger request is pending at the network entry point node or has been unsuccessfully sent to a user equipment:
delete the old device trigger request,
de-register from a user equipment reachability notification at a management database when the old device trigger request has successfully been deleted, and
determine that the device trigger recall request failed when the old device trigger request has been successfully sent to the user equipment or the old device trigger request has expired.

21. At least one non-transitory machine readable medium comprising instructions that, when executed by the machine, cause the machine to perform operations for managing device trigger action requests, the operations comprising:
receiving, at a network entry point node, a Device-Action Request command from an external services capability server with an action type attribute value pair set to indicate a device trigger action request for performing an action on an old device trigger request;
determining, by the network entry point node, a status of the old device trigger request from the external services capability server; and
sending, by the network entry point node, a response message to the external services capability server indicating status of device trigger action request,
wherein the sending the response message comprises:
sending a device trigger report associated with the old device trigger request indicating a status of the old device trigger request in response to the device trigger action request, and
sending a device trigger confirm message having a cause value set to indicate the Device-Action Request exceeds a limitation on a parameter associated with the external services capability server.

22. The at least one non-transitory machine readable medium of claim 21, wherein:
the sending the response message comprises sending a Device-Action Answer command having a cause value set to report a status of the device trigger action request, and
the sending the Device-Action Answer command having a cause value set to report a status of the device trigger action request further comprises:
sending a Device-Action Answer command having a cause value set to report success of a recall request for the old device trigger request,
sending a Device-Action Answer command having a cause value set to report failure of the recall request for the old device trigger request,
sending a Device-Action Answer command having a cause value set to report II all success of a replace request for the old device trigger request, the old device trigger being replaced with a new device trigger provided in the Device-Action Request, and
sending a Device-Action Answer command having a cause value set to report failure of the replace request for the old device trigger request, the old device trigger being requested to be replaced with a new device trigger provided in the Device-Action Request.

23. The at least one non-transitory machine readable medium of claim 21 further comprising:
sending from the network entry point node to a store and forward center, based on the Device-Action Request, a submit trigger replace request including an old device trigger reference number for identifying the old device trigger request and a new device trigger reference number identifying a substitute trigger request,
receiving, at the network entry point node, a submit trigger replace response message indicating success or failure of the submit trigger replace request, and
receiving, at the network entry point node, a trigger delivery report associated with the old device trigger request from the store and forward center indicating the old device trigger has been replaced.

* * * * *

UNITED STATES PATENT AND TRADEMARK OFFICE
CERTIFICATE OF CORRECTION

PATENT NO. : 9,554,296 B2  
APPLICATION NO. : 14/124984  
DATED : January 24, 2017  
INVENTOR(S) : Rao et al.

Page 1 of 1

It is certified that error appears in the above-identified patent and that said Letters Patent is hereby corrected as shown below:

In the Claims

In Column 21, Line 62, in Claim 12, delete "equipment;" and insert --equipment:-- therefor In Column 23, Line 12, in Claim 17, delete "transceivers:" and insert --transceiver:-- therefor In Column 24, Line 37, in Claim 22, after "report", delete "II all"

Signed and Sealed this
Fourth Day of June, 2019

Andrei Iancu
*Director of the United States Patent and Trademark Office*